United States Patent [19]
Kanazawa et al.

[11] Patent Number: 5,654,882
[45] Date of Patent: Aug. 5, 1997

[54] POWER CONVERTER AND AIR CONDITIONER USING SAME

[75] Inventors: Hidetoshi Kanazawa, Fuji; Yoshihito Mino, Fujikawa-Cho; Yasushi Yamanashi, Shimizu, all of Japan

[73] Assignee: Kabushiki Kaisha Toshiba, Kawasaki, Japan

[21] Appl. No.: 557,935

[22] Filed: Nov. 14, 1995

[30] Foreign Application Priority Data

Nov. 18, 1994 [JP] Japan .................................. 6-285317
Jun. 27, 1995 [JP] Japan .................................. 7-160706

[51] Int. Cl.$^6$ .................................................. H02M 5/45
[52] U.S. Cl. .......................................... 363/37; 363/89
[58] Field of Search .............................. 363/37, 45, 46, 363/89, 97, 124, 126, 127, 131

[56] References Cited

U.S. PATENT DOCUMENTS

| | | | |
|---|---|---|---|
| 5,111,373 | 5/1992 | Higaki | 363/37 |
| 5,177,677 | 1/1993 | Nakata et al. | 363/89 |
| 5,187,652 | 2/1993 | Steimer | 363/37 |

FOREIGN PATENT DOCUMENTS

| | | |
|---|---|---|
| 59-139868 | 8/1984 | Japan . |
| 62-163576 | 7/1987 | Japan . |
| 2 204 196 | 11/1988 | United Kingdom . |
| 93/12576 | 6/1993 | WIPO . |
| 95/06351 | 3/1995 | WIPO . |

OTHER PUBLICATIONS

Shirai et al., "Novel Three Phase High Power Factor Converters", Lecture Papers of National Convention IEEE, Japan Industry Application Society, pp. 1–2, (1994).

Nabae et al., "Novel Sinusoidal Converters With High Power Factor", Lecture Papers of National Convention.

*Primary Examiner*—Matthew V. Nguyen
*Attorney, Agent, or Firm*—Foley & Lardner

[57] ABSTRACT

A power converter comprises: a rectifier composed of a plurality of bridge-connected diodes; reactors each connected in series in each power line of the rectifier; a chopper circuit having two switching elements connected in series between two DC output terminals of the rectifier; star connection capacitors, each of one end thereof being connected to the power source side of each reactor and each of the other end thereof being connected in common to a mutual connection point of the two switching elements of the chopper circuit; a smoothing capacitor for smoothing an output voltage of the rectifier; and ring connection capacitors each connected between two power lines and further between the AC power source and each of the reactors.

16 Claims, 24 Drawing Sheets

LINE VOLTAGE
100V/div

U-PHASE CURRENT
0.5A/div

W-PHASE CURRENT
0.5A/div

V-PHASE CURRENT
0.5A/div

TIME →

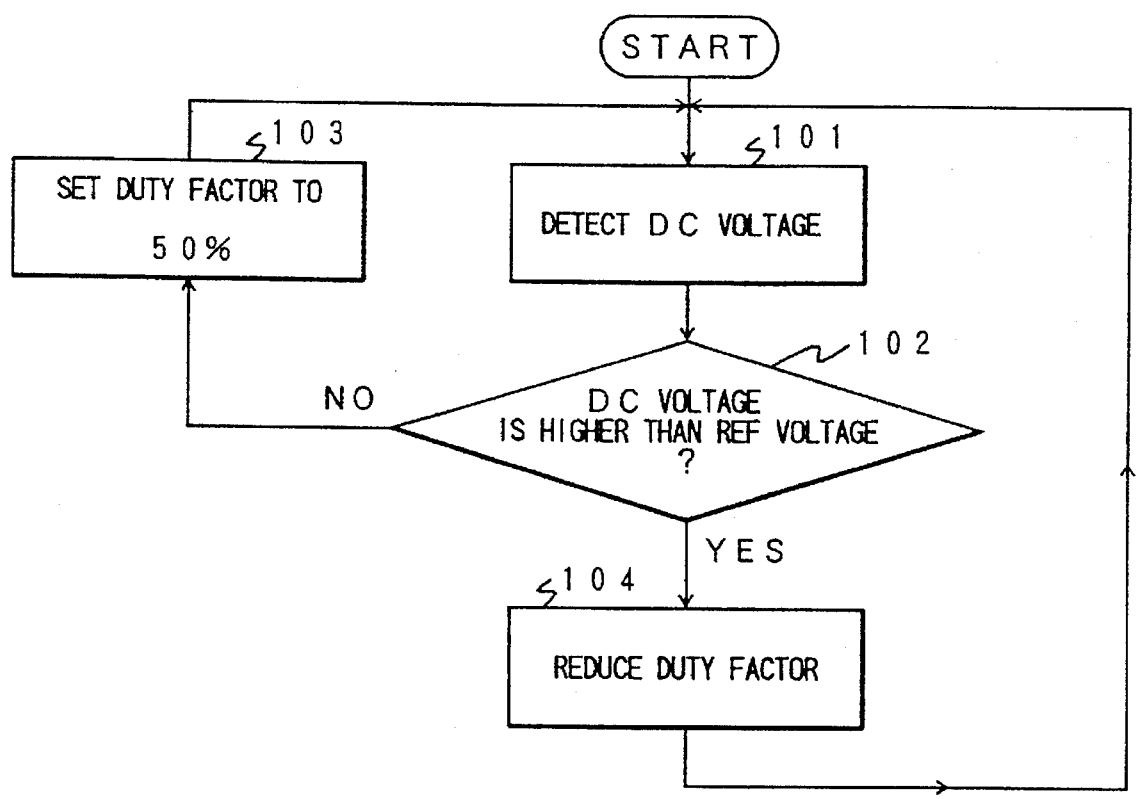
F I G. 10

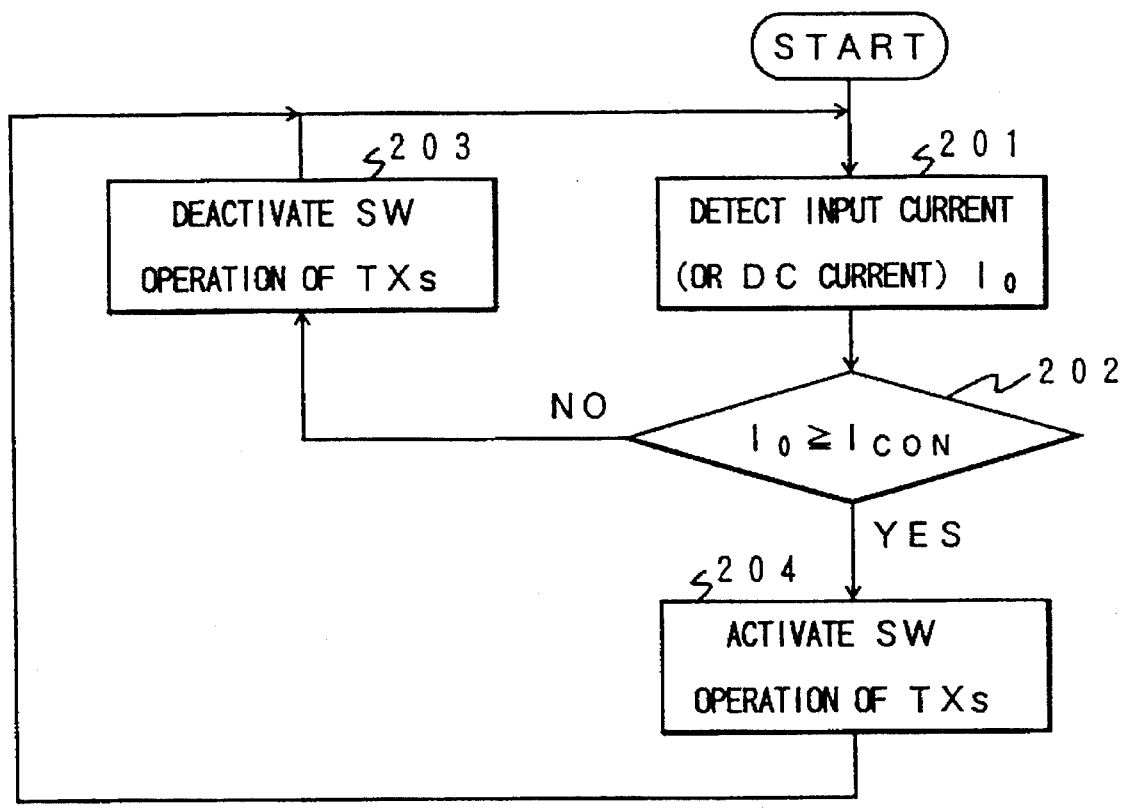
F I G. 14

5,654,882

1

POWER CONVERTER AND AIR CONDITIONER USING SAME

BACKGROUND OF THE INVENTION

1. Field of the Invention

The present invention relates to a power converter and an air conditioner using the same power converter, and more specifically to a power converter using a high power factor rectifier circuit and an air conditioner using the same converter.

2. Description of the Prior Art

An example of high power factor rectifier circuits is disclosed by [Thee phase high power factor converter], 1994, Lecture Papers of National Convention I.E.E. JAPAN Industry Application Society.

FIG. 1 shows this prior art high power factor rectifier circuit. In the drawing, a three-phase rectifier 9 is composed of six bridge-connected diodes $D_1$ to $D_6$. A three phase AC power source PS is connected to three AC input terminals of this three-phase rectifier 9 via three series-connected reactors $L_1$, $L_2$, and $L_3$, respectively. To each output line of the power source PS, one end of a star connection capacitors $C_1$, $C_2$, and $C_3$ is connected, respectively. Further, a chopper circuit 10, a smoothing capacitor $C_{DC}$ and a load resistance $R_L$ are connected in parallel to each other between two output terminals of the rectifier 9. The chopper circuit 10 is composed of series-connected two insulated-gate bipolar transistors (IGBT) $TX_1$ and $TX_2$ each having an inverse voltage protection diode $D_7$ or $D_8$. The common connection point of these two transistors $TX_1$ and $TX_2$ is connected to a common connection point (i.e., a neutral point) of the star connection capacitors $C_1$, $C_2$, and $C_3$. Further, three impedances $Z_1$, $Z_2$, and $Z_3$ intervening between the power source PS and the three reactors $L_1$, $L_2$ and $L_3$ are denoted for later explanation.

Since this prior art high power factor rectifier is known, the detailed description of the operation principle thereof is omitted herein. In summary, however, the object of this rectifier circuit is to allow the input line voltage (shown in FIG. 2A) on the power source side of the reactors $L_1$, $L_2$, and $L_3$ and the line current (shown in FIGS. 2B to 2D) to approach a sine wave of less distortion, respectively, by applying a high frequency signal (e.g., 10 kHz which is much higher than a frequency (e.g., 50 Hz) of the power source PS) to gates $g_1$ and $g_2$ of the transistors $TX_1$ and $TX_2$ of the chopper circuit 10, that is, by turning on and off the two transistors $TX_1$ and $TX_2$ alternately at the high frequency.

In this prior art high power factor rectifier, since the circuit can be formed by adding a few elements to a rectifier circuit of capacitor input type, that is, since a complicated control is not required, being different from the case of current detections or of a PWM (pulse width modulation) control, there exists a feature that it is possible to improve the waveform of each line current and the power factor, in spite of a simple circuit construction.

On the other hand, FIG. 3 shows a prior art power converter for supplying AC power to a load by using a high power factor rectifier circuit shown in FIG. 1. In this power converter, an inverter 11 composed of bipolar transistors and an AC motor 12 (as a load) are connected, instead of the load resistance $R_L$ of the rectifier circuit shown in FIG. 1. In this power converter, a DC current flowing between the rectifier 9 and the chopper circuit 10 is detected by a current detector HCT using a Hall element, and a protective circuit 21 applies

2 a current limiting signal to a chopper control circuit 22 so that the DC detected current will not exceed a predetermined value. In addition, a DC current flowing between the chopper circuit 10 and the inverter 11 is detected by a low resistance $R_s$, and another protective circuit 23 applies another signal to an inverter control circuit 24 so that the DC current value can be limited below a predetermined value on the basis of the detected value.

When the power converter as shown in FIG. 3 is used, it is possible to control the motor 12 at variable speed while maintaining the waveform of the input current and the power factor under excellent conditions under protection of the power converter.

In the above-mentioned prior art high power factor rectifier circuit, as far as the input current lies in such a relatively small current range as 1 to 2 [A], the input current waveform and the power factor can be both maintained under excellent conditions. However, the voltage waveform is distorted, as the input current increases.

In this connection, in the rectifier circuit shown in FIG. 1, when the input current exceeds 10 [A] on condition that the power source voltage is 100 [V]; the frequency is 50 [Hz]; the switching frequency of the chopper circuit 10 is 10 [kHz]; the capacitance of each of the star connection capacitors $C_1$, $C_2$, and $C_3$ is 3300 [μF]; the load resistance $R_L$ is 187.5 [Ω]; and each inductance of the reactors $L_1$, $L_2$, and $L_3$ is 1.5 [mH], the input current and the phase voltage change as shown in FIG. 4. This may be due to the fact that a sort of oscillation occurs in such a way that current flows from the power source line to the load through the star connection capacitors $C_1$, $C_2$, and $C_3$, so that the voltage waveform is distorted and thereby the current is also distorted by the distorted voltage. In this case, the oscillation is generated by the presence of the line impedances $Z_1$, $Z_2$, and $Z_3$.

On the other hand, in the power converter shown in FIG. 3, since various circuits such as the two protective circuits; that is, since the protective circuit 21 for protecting the transistors $TX_1$ and $TX_2$ of the chopper circuit 10 and the protective circuit 23 for protecting the switching elements for constituting the inverter circuit 11, there exists a drawback that the circuit construction is complicated to that extent.

Further, in the prior art power converter, there exists another problem in that when the load is light, the DC voltage increases, so that the parts or elements may be broken due to over-voltage, thus an improvement being so far needed.

SUMMARY OF THE INVENTION

Accordingly, it is a first object of the present invention to provide a power converter and an air conditioner using the same power converter, which can maintain excellent input current and voltage waveforms, even if the input current increases with increasing load.

Further, a second object of the present invention is to provide a power converter and an air conditioner using the same power converter, which is provided with a simplified protective circuit for protecting switching elements, even when the inverter is additionally incorporated therein.

To achieve the above-mentioned object, the present invention provides a power converter, comprising: a rectifier composed of a plurality of bridge-connected diodes, an AC input terminal thereof being connected to an AC power source; reactors each connected in series in a power line connecting between said rectifier and the AC power source, respectively; star connection capacitors, each of one end thereof being connected to the power line between the AC power source and each of said reactors, and each of the other end thereof being connected in common; a chopper circuit having two switching elements connected in series between two DC output terminals of said rectifier, a mutual common connection point of the two switching elements being connected to the common connection point of said star connection capacitors, the two switching elements being controllably turned on or off at a frequency greatly higher than a frequency of the AC power source; a smoothing capacitor connected between the DC output terminals of said rectifier; and ring connection capacitors each connected between two power lines and further between the AC power source and each of the reactors.

In the power converter according to the present invention, since the ring connection capacitors are connected between the power source and the reactors provided on the power source side of the rectifier, even if input current increases, the input current and the input voltage are not subjected to influence of the line impedances, so that it is possible to maintain the waveforms of both the input current and voltage under excellent conditions.

Here, it is preferable that capacitance of each of the ring connection capacitors is determined larger than that of each of the star connection capacitors, because the oscillation of the power converter can be suppressed securely.

Further, it is preferable that the power converter further comprises an inverter composed of switching elements the same in current rating as that of the switching elements of the chopper circuit, the inverter converting DC power rectified by the rectifier and smoothed by the smoothing capacitor into AC power to suppy to a load; current detecting means for detecting output current of the rectifier; and a protective circuit for applying a protection signal to both the chopper circuit and the inverter, when current value detected by the current detecting means exceeds a predetermined reference value. In this case, since the current rating of the switching elements for constituting the chopper circuit is equivalent to that of the switching elements of the inverter, it is possible to protect both the chopper circuit and the inverter by a single protective circuit.

Further, when current detecting means for detecting change rate of current flowing through the smoothing capacitor is provided, since a general purpose current transformer can be used (without use of any Hall element), it is possible to further reduced the cost of the power converter.

Further, it is also preferable that the power converter further comprises: current detecting means for detecting DC input current value or DC output current value of the rectifier; and a protective circuit for suppressing the switching operation of the chopper circuit until the current value detected by the current detecting means exceeds a predetermined value. In this case, it is possible to suppress a rise in voltage under a small load.

Further, it is preferable that the power converter further comprises a protective circuit for suppressing the switching operation of the chopper circuit until a predetermined time has elapsed after start of the inverter or unit output frequency of the inverter exceeds a predetermined value. By doing this, it is possible to suppress a rise in voltage at the initial operation.

Further, it is preferable that the power converter further comprises: a protective circuit for changing duty factor of the switching elements of the chopper circuit so that the current value detected by the current detecting means can be minimized. In this case, it is possible to protect both the chopper circuit and the inverter at the same time, while maximizing the power efficiency.

Further, it is preferable that the inverter is composed of switching elements each having current rating smaller than that of the switching elements of the chopper circuit is provided. In this case, even if the switching elements different in the current capacity between the chopper circuit and the inverter are used in correspondence to the short-circuit currents, respectively, when the common protection level is determined for both, it is possible to protect both the chopper circuit and the inverter by a single protective circuit.

Further, to achieve the above-mentioned object, the present invention provides an air conditioner, comprising: a rectifier composed of a plurality of bridge-connected diodes, an AC input terminal thereof being connected to an AC power source; reactors each connected in series in a power line connecting between the rectifier and the AC power source, respectively; star connection capacitors, each of one end thereof being connected to the power line between the AC power source and each of the reactors, and each of the other end thereof being connected in common; a chopper circuit having two switching elements connected in series between two DC output terminals of the rectifier, a mutual common connection point of the two switching elements being connected to the common connection point of the star connection capacitors, the two switching elements being controllably turned on or off at a frequency greatly higher than a frequency of the AC power source; a smoothing capacitor connected between the DC output terminals of the rectifier; ring connection capacitors each connected between two power lines and further between the AC power source and each of the reactors; and an inverter for converting DC power rectified by the rectifier and smoothed by the smoothing capacitor into AC power to supply to a motor for driving a compressor included in a refrigerating cycle.

In the air conditioner according to the present invention, since the compressor motor for driving the compressor included in the refrigerating cycle is driven by the voltage waveform of less distortion generated by the power converter according to the present invention, it is possible to eliminate abnormal sound generated by the motors for driving the in-door air blower and the out-door air blower, as well as noise generated by the compressor driving motor.

Further, it is preferable that the inverter changes AC output frequency thereof according to change in air conditioner load and AC output voltage thereof in accordance with a predetermined V/F pattern indicative of relationship between the voltage and the frequency; and when two switching elements for constituting the chopper circuit are abnormal, the inverter turning off these switching elements of the chopper circuit and further changing the frequency thereof in accordance with another V/F pattern to maintain magnetic flux of the compressor driving motor. In this case, when the power converter is operated in case of emergency due to the abnormality of the switching elements of the inverter, it is possible operate the inverter effectively in an emergency by turning off the switching elements of the inverter and by changing the inverter frequency in accordance with another V/F patterns which can maintain the magnetic flux of the compressor motor.

Further, it is preferable that the chopper circuit is composed of the switching elements having a current rating larger than that of switching elements for constituting the inverter; and a reference current value for discriminating whether the respective switching elements of both the chopper circuit and the inverter must be protected or not is determined in common for both the chopper circuit and the inverter. In this case, even when the current rating is different between the chopper circuit and the inverter, it is possible to protect both the chopper circuit and the inverter by use of a single protective circuit of a common protection level.

Further, it is preferable that when an input current to the rectifier increases or decreases, at least one of switching frequency and duty factor of the switching elements for constituting the chopper circuit is decreased or increased to maintain an input voltage of the inverter at a constant level. In this case, even if the load changes, it is possible to control current capacity at a high precision.

Further, it is preferable that the switching frequency f of the chopper circuit is maintained within a following range $$f > \frac{1}{\pi\sqrt{LC}} \quad (1)$$

where L denotes an inductance and C denotes a capacitance of a series connected RLC equivalent circuit when seen from both ends of the chopper circuit.

Further, it is preferable that the rectifier is composed of low-speed diodes and two high-speed diodes are connected in positive and negative connection lines between the rectifier and the chopper circuit, respectively. In this case, it is possible to secure any required voltage in a high switching frequency range.

BRIEF DESCRIPTION OF THE DRAWINGS

In the attached drawings:

FIG. 10 is a flowchart for assistance in explaining the operation of the power converter shown in FIG. 9;

FIG. 14 is a flowchart for assistance in explaining the operation of the power converter shown in FIG. 12;

DETAILED DESCRIPTION OF THE PREFERRED EMBODIMENTS

The present invention will be described hereinbelow in detail with reference to the attached drawings.

Figure 1:
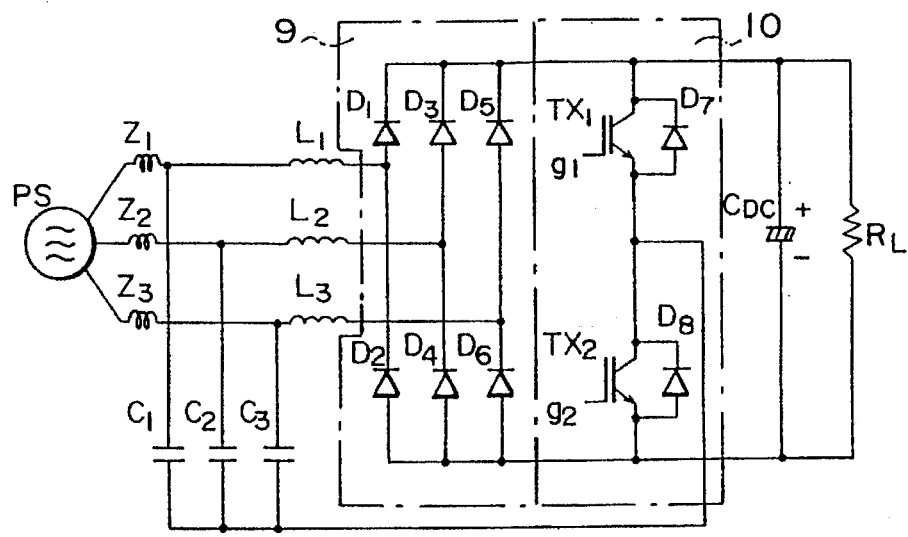
FIG. 1 is a circuit diagram showing a prior art power converter.
Figure 2A:
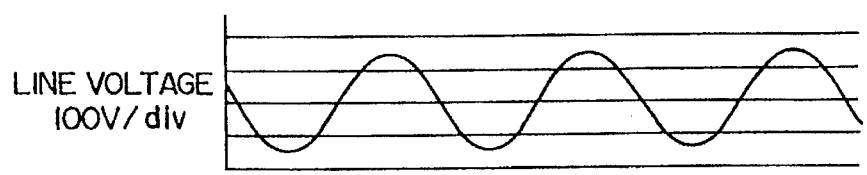
FIGS. 2A to 2D are waveform diagrams showing the essential portions of the power converter shown in FIG. 1, for assistance in explaining the operation thereof.
Figure 2B:
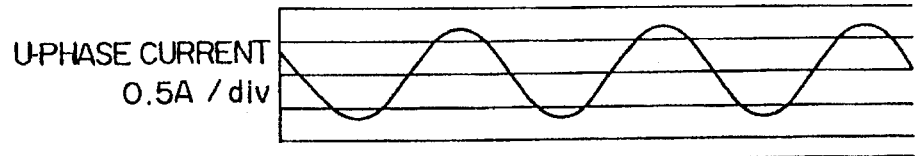
Figure 2C:
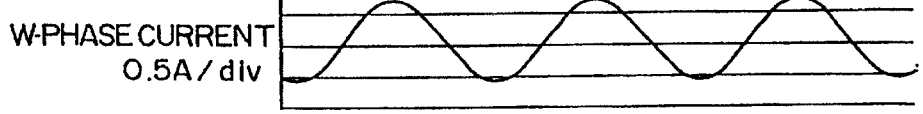
Figure 2D:
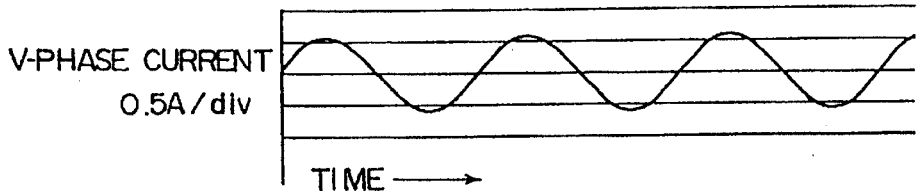
Figure 5:
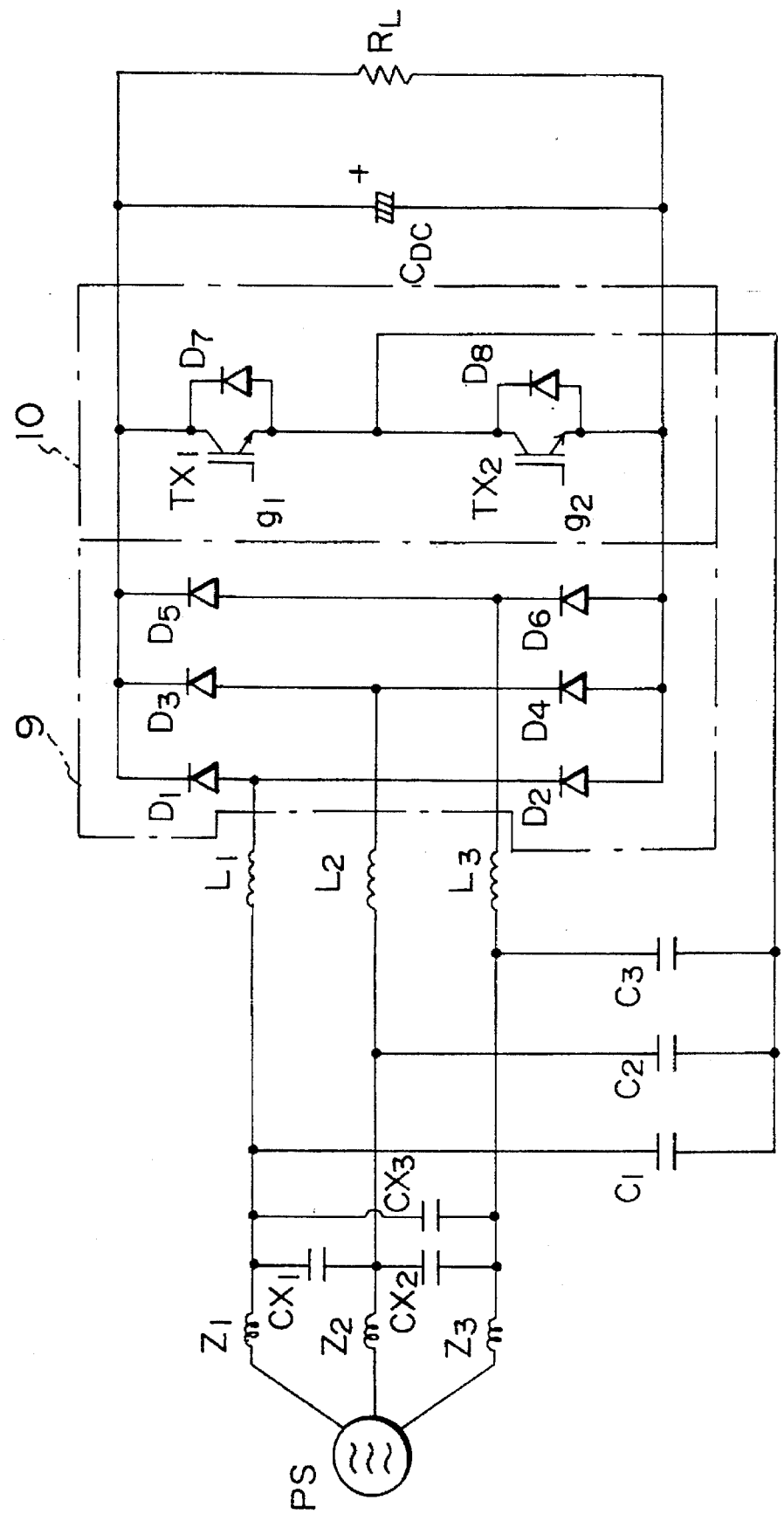
FIG. 5 is a circuit diagram showing a first embodiment of the power converter according to the present invention.

FIG. 5 shows a first embodiment of the power converter according to the present invention, in which the same reference numerals have been retained for similar parts or elements which have the same functions as with the case of the prior art power converter shown in FIG. 1 without repeating the same description thereof.

In FIG. 5, three capacitors $CX_1$, $CX_2$ and $CX_3$ are additionally connected between the mutual two power lines on the power source side of the reactors $L_1$, $L_2$, and $L_3$, respectively. Since being connected in a ring connection, these capacitors are referred to as ring-connection capacitors, for discrimination of these capacitors from the star connection capacitors $C_1$, $C_2$ and $C_3$. These three ring connection capacitors $CX_1$, $CX_2$ and $CX_3$ serve to substantially reduce the line impedances $Z_1$, $Z_2$, and $Z_3$ which cause the oscillation when the load current increases. Therefore, the line voltage can be stabilized more, as the static capacitance of each of these capacitors increases. Experiments indicates that when the capacitance of each of these capacitors $CX_1$, $CX_2$ and $CX_3$ is increased more than that of each of the star connection capacitors $C_1$, $C_2$ and $C_3$, the voltage waveform and current waveform can be improved markedly.

Figure 6:
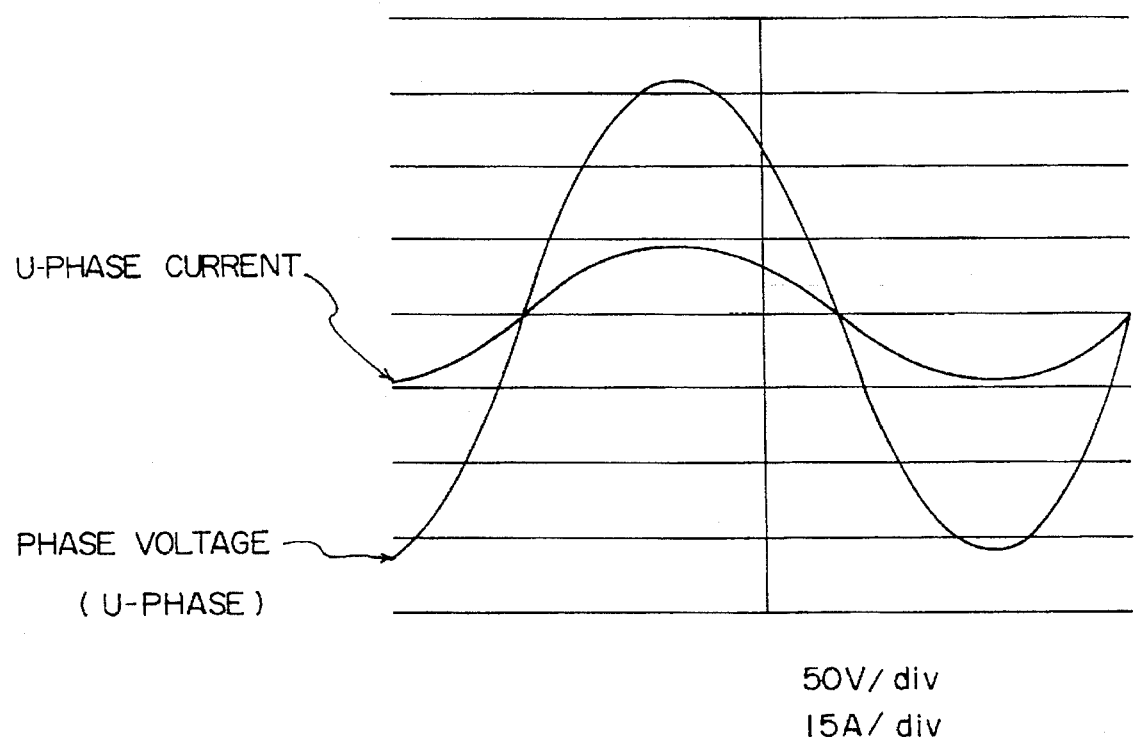
FIG. 6 is a waveform diagram showing the input current and phase voltage for assistance in explaining the operation of the power converter shown in FIG. 5.

FIG. 6 is a waveform diagram showing the input current and the phase voltage of the power converter shown in FIG.

Figure 4:
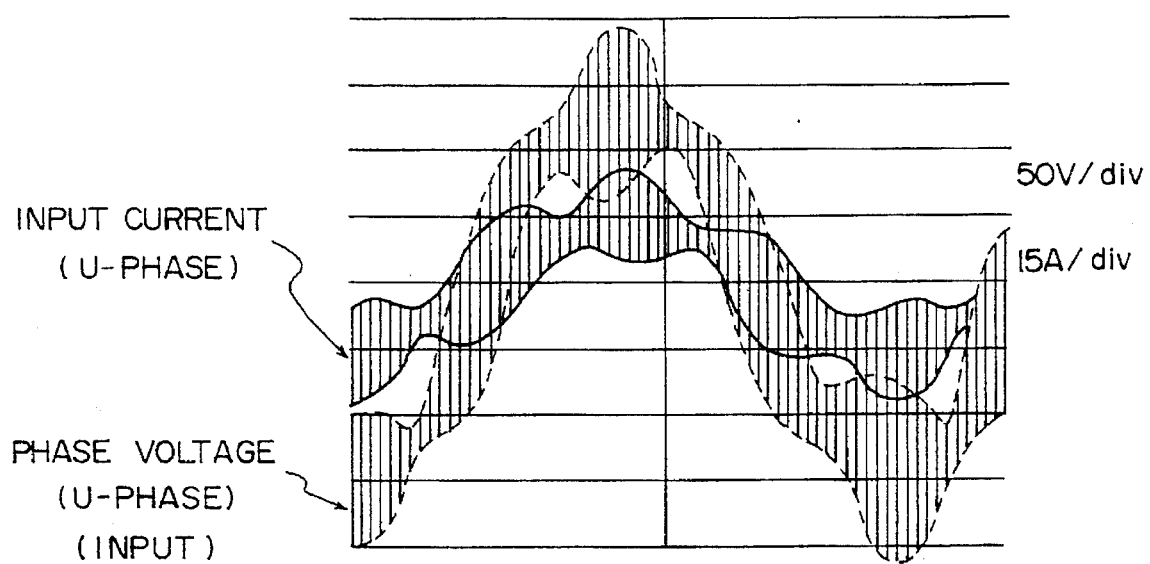
FIG. 4 is a waveform diagram for assistance in explaining the operation of the prior art power converter shown in FIG. 3, when the load becomes heavy.

5. In comparison with the input current and the phase voltage of the prior art power converter shown in FIG. 4, it is understood that the oscillation phenomenon can be suppressed and thereby the distortion factor can be suppressed markedly.

Figure 3:
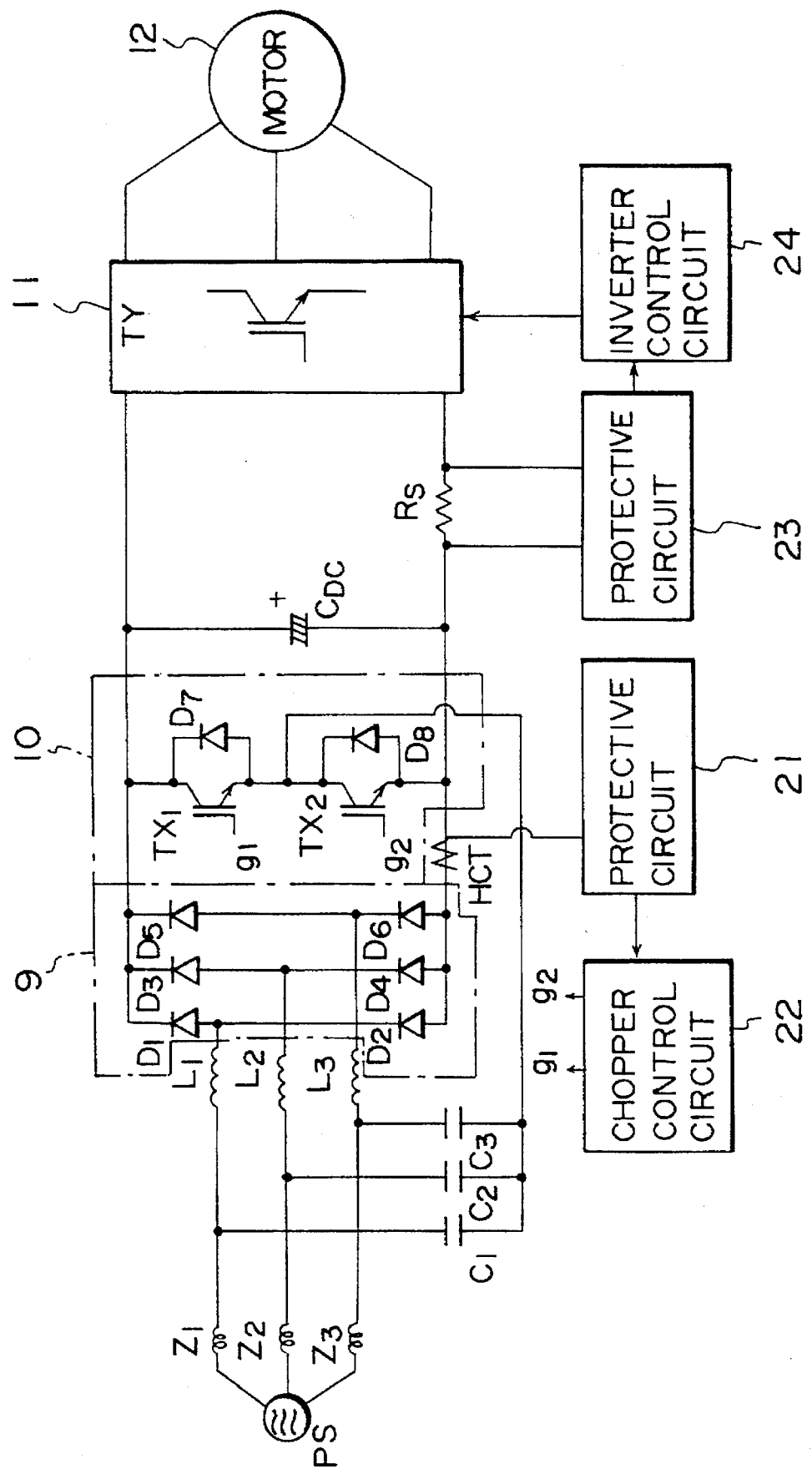
FIG. 3 is a circuit diagram showing another prior art power converter.
Figure 7:
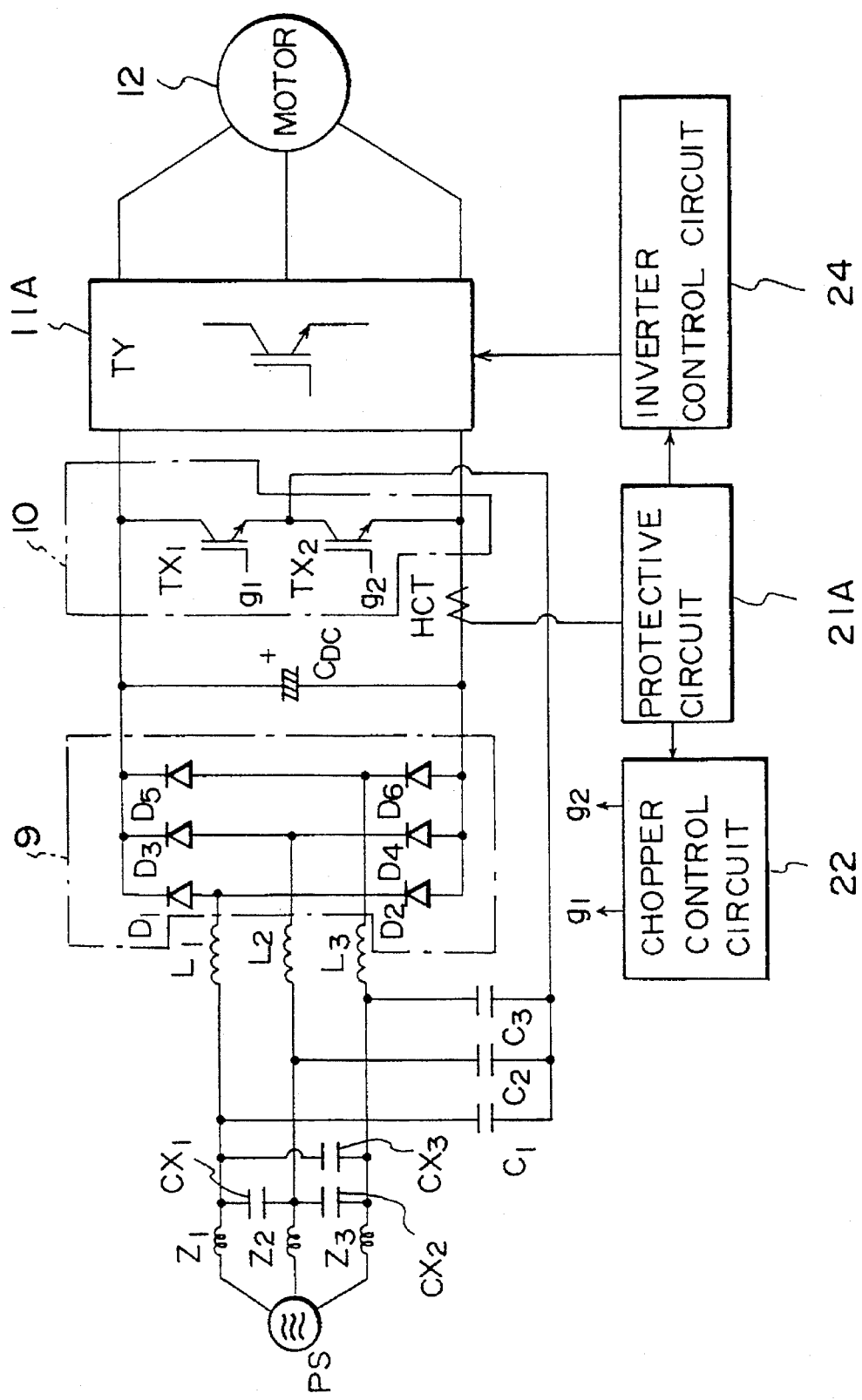
FIG. 7 is a circuit diagram showing a second embodiment of the power converter according to the present invention.

FIG. 7 is a circuit diagram showing a second embodiment of the power converter according to the present invention. In FIG. 7, IGBTs (insulated gate bipolar transistors) are used as the transistors TY for constituting an inverter 11A. In addition, the transistor having the same rating as that of the transistors $TX_1$ and $TX_2$ for constituting the chopper circuit 10 are used as the transistors TY for constituting the inverter 11A. As is well known, since the inverter 11A includes series-connected transistors for each phase, when the IGBTs having the same rating as that of the transistors $TX_1$ and $TX_2$ for constituting the chopper circuit 10 are used as the transistors of the inverter 11A, it is possible to set the threshold value for deciding the maximum allowable current of the respective transistors at the same level. Here, the input-side line current of the chopper circuit 10, that is, a sum of the current flowing through the chopper circuit 10 and the current flowing through the inverter 11A is detected by a current detector HCT using a Hall element. When the detected current value exceeds a predetermined value, the protective circuit 21A outputs a current suppression signal to both the chopper control circuit 22 and the inverter control circuit 24. Accordingly, the resistor $R_s$ for detecting current and the protective circuit 23 as shown in FIG. 3 can be both eliminated, thus further simplifying the construction of the power converter.

Figure 8:
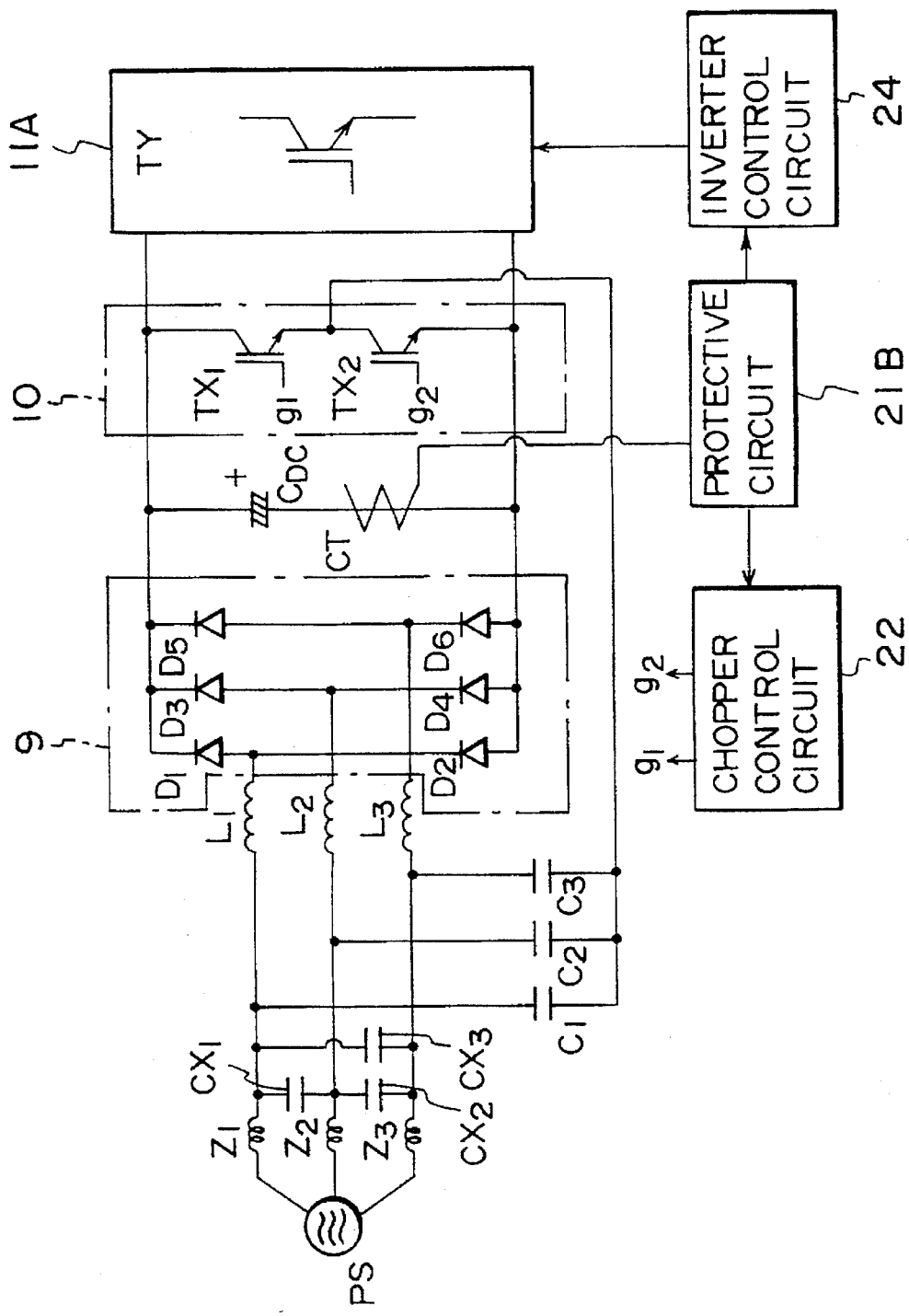
FIG. 8 is a circuit diagram showing a third embodiment of the power converter according to the present invention.

FIG. 8 shows a third embodiment of the power converter according to the present invention, in which the change rate of current flowing through the smoothing capacitor $C_{DC}$ is detected by a current transformer CT, and the detected result is inputted to the protective circuit 21B. In general, in case a large current flows due to short circuit of the transistors $TX_1$ and $TX_2$ for constituting the chopper circuit 10 or the transistors for constituting the inverter 11A, before current flows through the reactors $L_1$, $L_2$, and $L_3$ of large impedance and the rectifier 9, the smoothing capacitor $C_{DC}$ first discharges electric charge. The current transformer CT detects this initial over-current (i.e., a current change rate) and applies the detected result to the protective circuit 21B. Here, when the detected current change rate exceeds a predetermined value, the protective circuit 21B applies a current suppressing signal to both the chopper control circuit 22 and the inverter control circuit 24.

In this embodiment shown in FIG. 8, since a general purpose current transformer CT can be used, instead of the current detector HCT using the Hall element, it is possible to further reduce the cost of the power converter.

Figure 9:
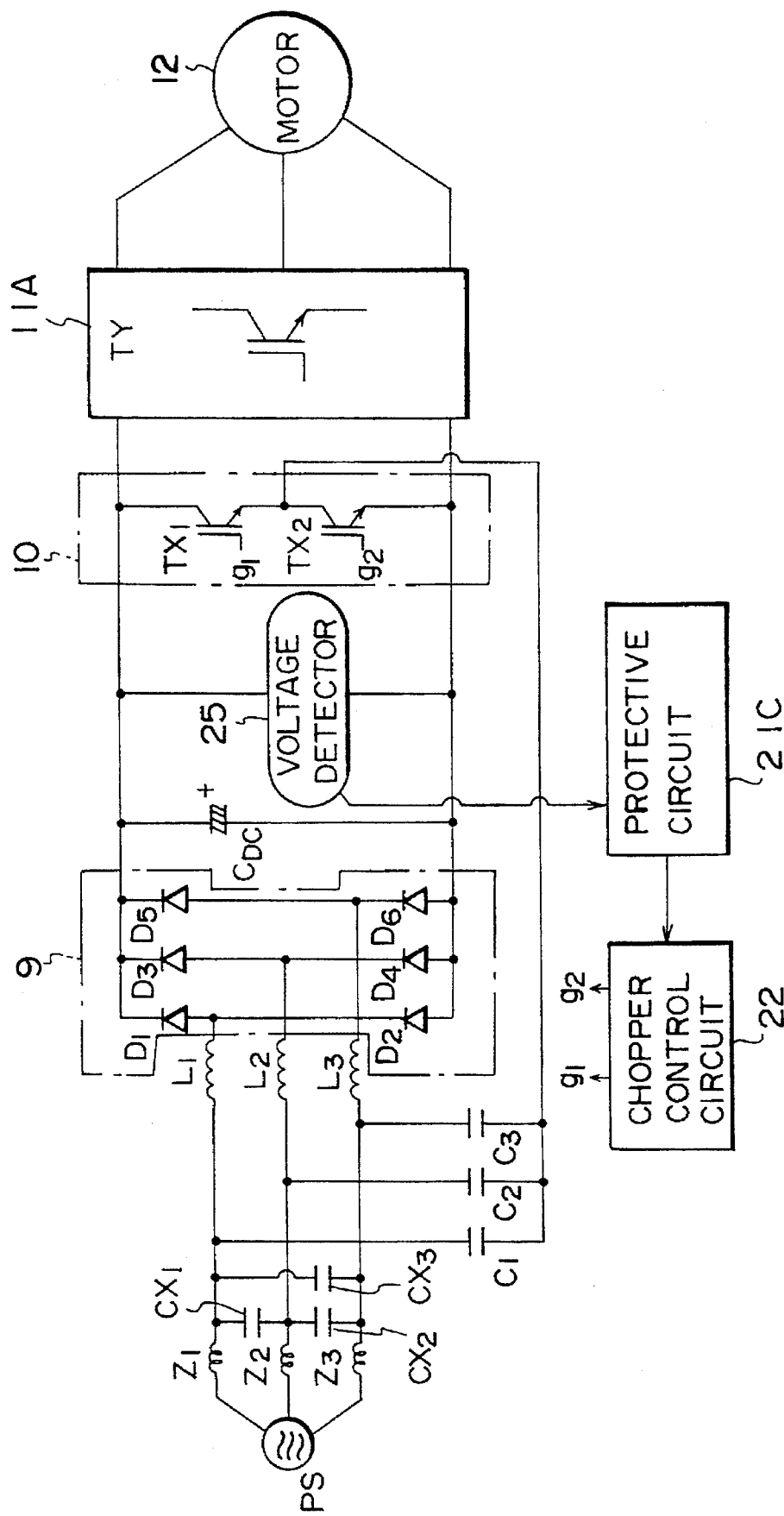
FIG. 9 is a circuit diagram showing a fourth embodiment of the power converter according to the present invention.

FIG. 9 shows a fourth embodiment of the power converter according to the present invention. In this embodiment, the current transformer CT shown in FIG. 8 is eliminated. Instead, a voltage detector 25 for detecting a DC voltage on the output side of the rectifier 9 is provided. The detected voltage signal of the voltage detector 25 is inputted to a protective circuit 21C. Here, the protective circuit 21C is so constructed as to apply a frequency (or duty factor) change command to the chopper control circuit 22 so that the detected voltage value will not exceeds a predetermined reference voltage value.

Figure 11A:
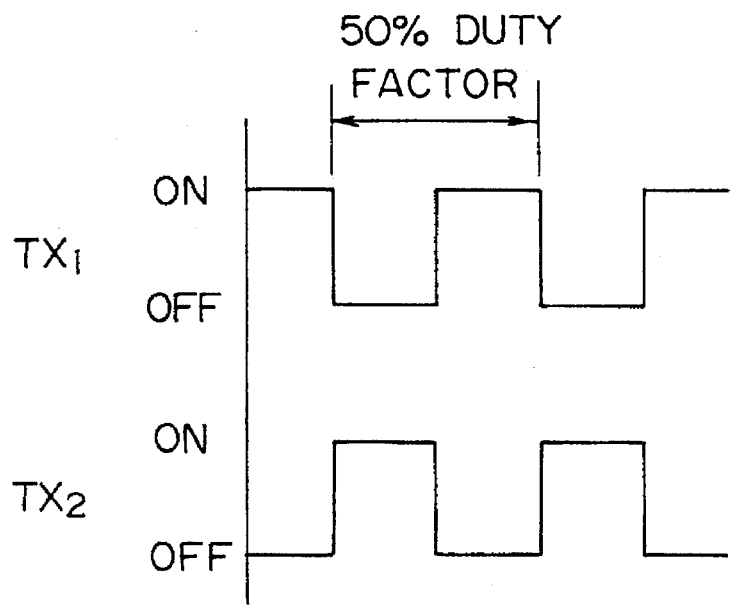
FIGS. 11A and 11B are waveform diagrams showing the essential elements of the power converter shown in FIG. 9, for assistance in explaining the operation thereof.
Figure 11B:
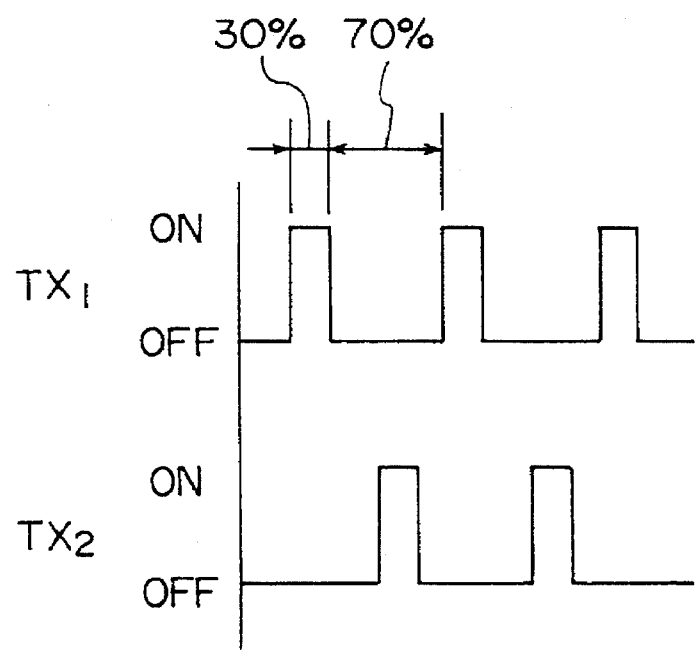

FIG. 10 shows a flowchart showing the processing procedure of the protective circuit 21C of the power converter shown in FIG. 9. In step 101, a control section or microcomputer (referred to as control, hereinafter) of the protective circuit 21C reads the detected voltage value. In step 102, control discriminates whether the detected voltage value exceeds a reference value. If NO, in step 103, control maintains the duty factor at 50%, as shown in FIG. 11A. If YES, in step 104, control reduces the duty factor down to 30%, as shown in FIG. 11B. Therefore, even if the input current increases, since the input current waveform and the input voltage waveform can be both maintained under excellent conditions and further since the DC voltage can be maintained less than the reference value, it is possible to protect the switching elements for constituting the inverter 11A, as well as the chopper circuit 10 simultaneously, by use of the same protective circuit 21C.

In the above description, although the duty factor of the chopper circuit 10 is controllably changed, it is also possible to protect the chopper circuit 10 and the inverter 11A from an excessive voltage rise, by changing the on-off frequency of the chopper circuit 10, instead of changing the duty factor of the chopper circuit 10.

Figure 12:
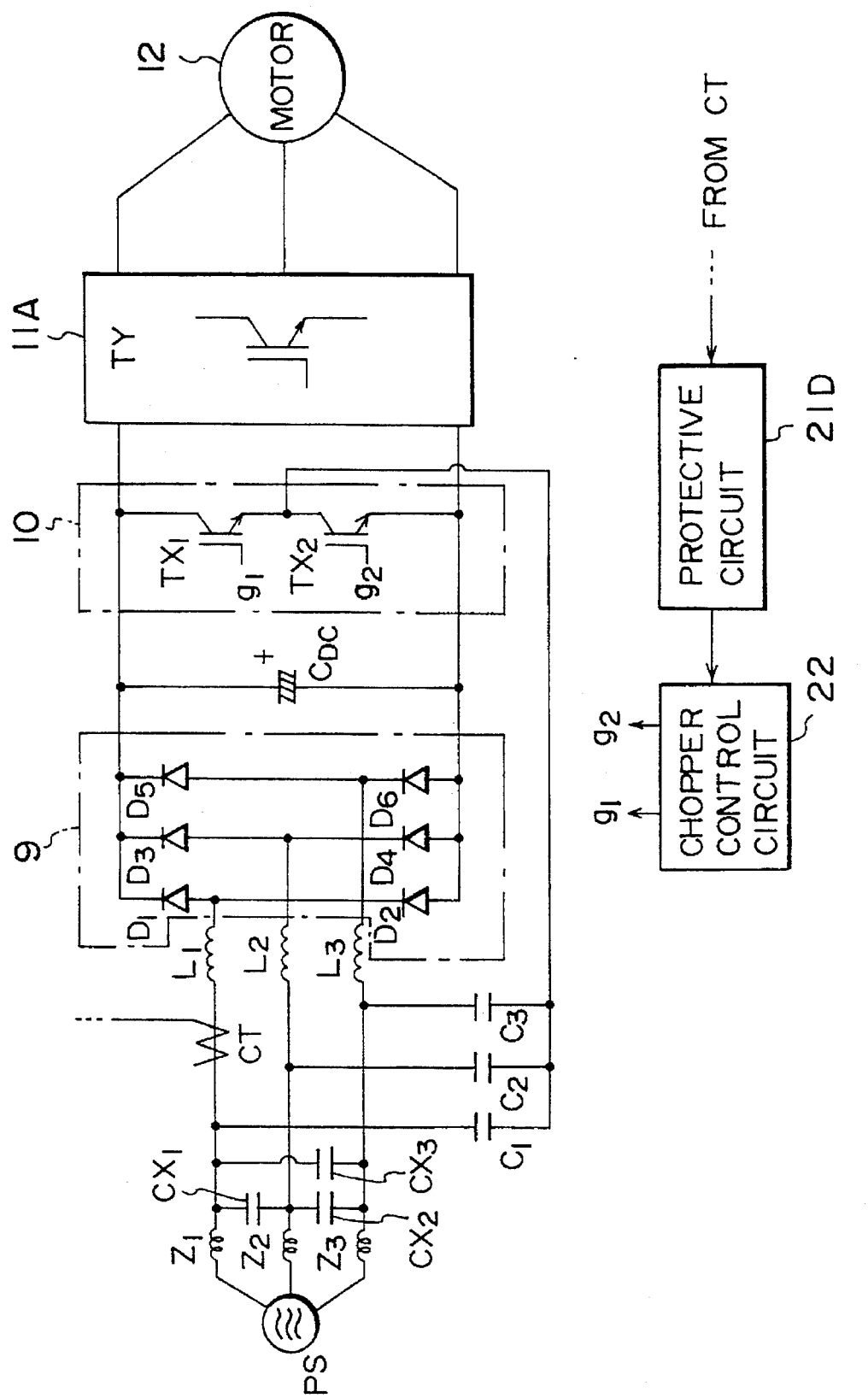
FIG. 12 is a circuit diagram showing a fifth embodiment of the power converter according to the present invention.

FIG. 12 shows a fifth embodiment of the power converter according to the present invention. In this embodiment, the input current of the rectifier 9 is detected by the current transformer CT, and the detected signal is applied to a protective circuit 21D. Here, the protective circuit 21D outputs a protective signal to the chopper control circuit 22 so that the switching operation of the chopper circuit 10 is kept stopped, until the detected current value exceeds a predetermined value.

Figure 13:
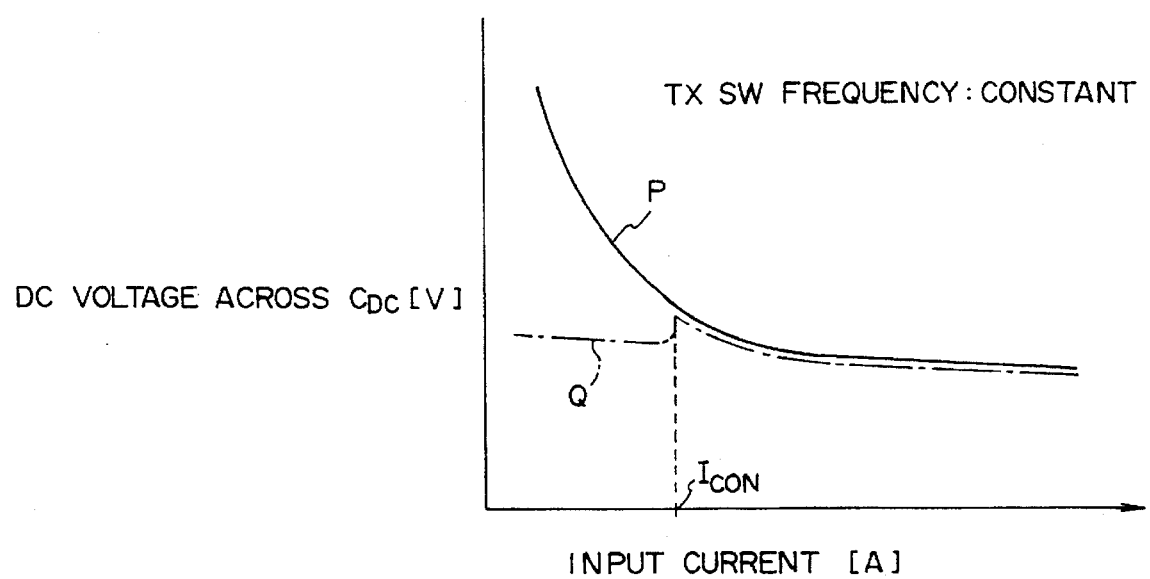
FIG. 13 is a graphical representation showing the relationship between the input current and the DC voltage, for assistance in explaining the operation of the power converter shown in FIG. 12.

In more detail, when the load of the power converter as shown in FIG. 12 is changed, there exists such decrease functional relationship between the input current to the rectifier 9 and the DC voltage (voltage across the capacitor $C_{DC}$) as shown by a solid curve P in FIG. 13. In other words, the dc voltage increases with decreasing input current. In the embodiment as shown in FIG. 12, the respective switching elements for constituting the chopper circuit 10 and the inverter 11A can be protected from this voltage increase. That is, in a range where the input current of the rectifier 9 is smaller than a constant value $I_{con}$, the switching operation of the chopper circuit 10 is kept stopped. Further, this constant value $I_{con}$ is set to a voltage value slightly higher than the DC voltage under the rated load.

FIG. 14 shows a flowchart showing the processing procedure of the protective circuit 21D of the power converter shown in FIG. 12. In step 201, a control section or microcomputer (referred to as control, hereinafter) of the protective circuit 21D reads the current value $I_0$ detected by the current transformer CT. In step 202, control discriminate whether the detected current value $I_0$ is equal to or less than a constant value $I_{con}$. If NO, in step 203, control suppresses the switching operation of the transistors $TX_1$ and $TX_2$. If YES, in step 204, control operates the switching action of the transistors $TX_1$ and $TX_2$. Therefore, the relationship between the DC voltage and the input current becomes as shown by a chain line Q in FIG. 13, so that it is possible to protect the chopper circuit 10 and the inverter 11A from a rise in voltage under light load.

Further, in this embodiment, although the current transformer CT is used to detect the input ac current of the rectifier 9, it is also possible to protect the circuits in the same way by detecting the output dc current of the rectifier 9 and by applying the detected value to the protective circuit 21D. In this case, the current detector using a Hall element is used.

Figure 15:
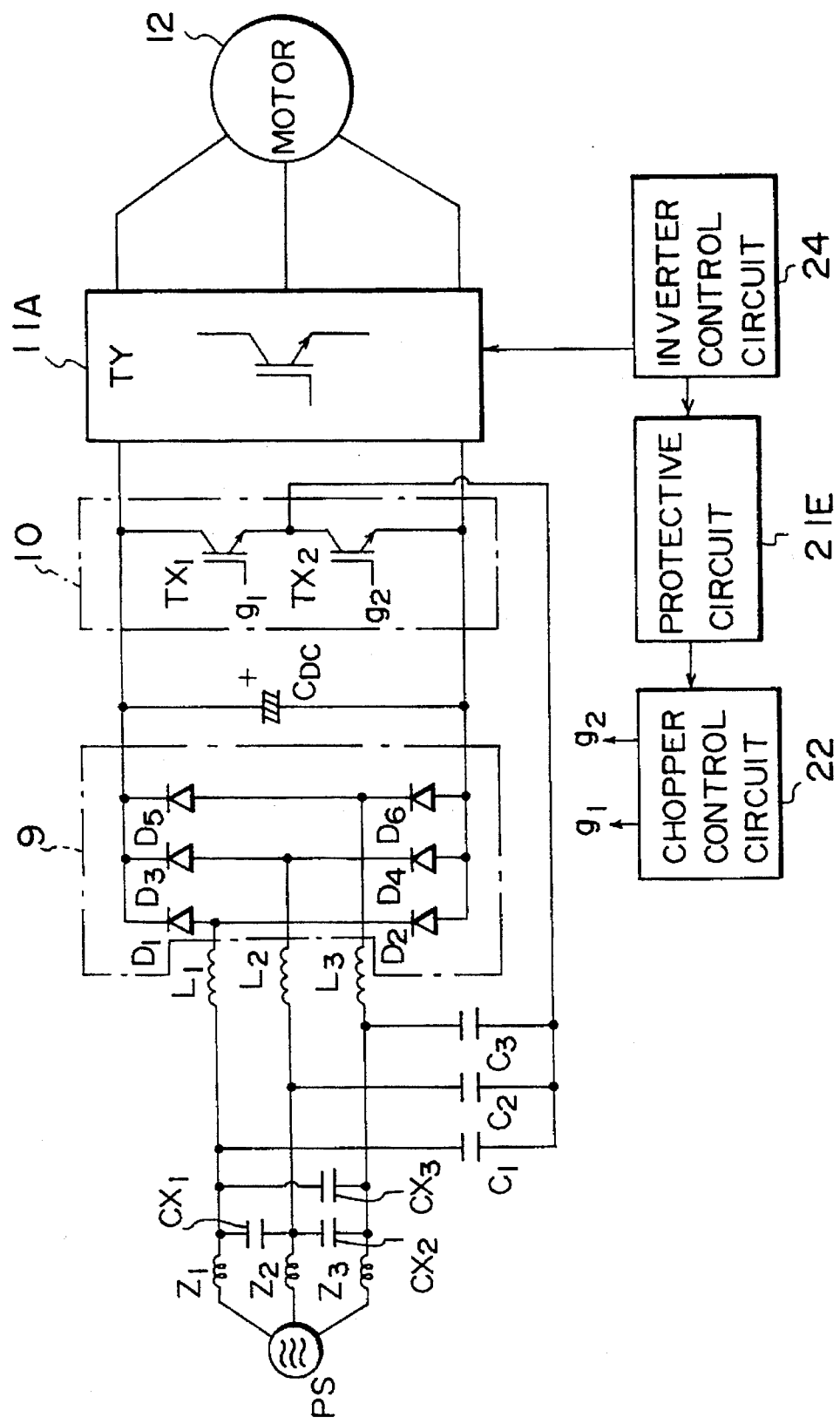
FIG. 15 is a circuit diagram showing a sixth embodiment of the power converter according to the present invention.

FIG. 15 shows a sixth embodiment of the power converter according to the present invention. In this embodiment, an inverter control circuit 24 applies an inverter control signal (for starting the control operation of the inverter 11A and driving a motor 12) to a protective circuit 21E. The protective circuit 21E gives a protection signal to the chopper control circuit 22, in such a way that the switching operation of the chopper control circuit 22 is not started until a constant time has elapsed after the start of the motor 12. In this case, the constant value is determined in correspondence to the above-mentioned current value $I_{con}$.

Figure 16:
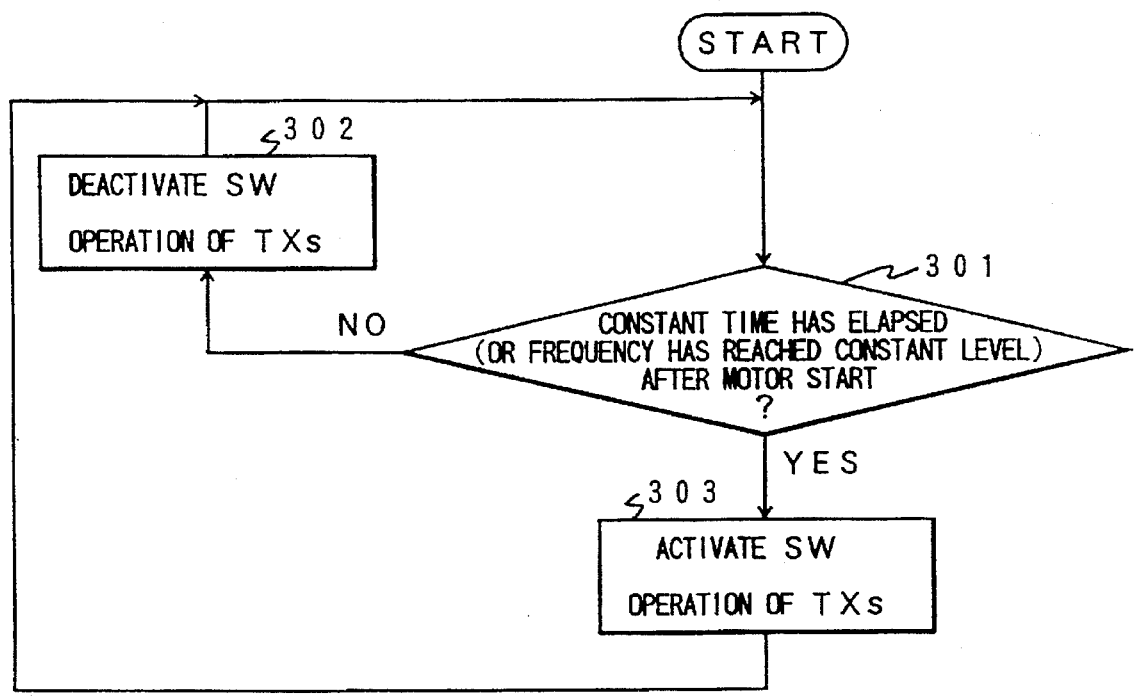
FIG. 16 is a flowchart for assistance in explaining the operation of the power converter shown in FIG. 15.

FIG. 16 shows a flowchart showing the processing procedure of the protective circuit 21E of the power converter shown in FIG. 15. In step 301, a control section or microcomputer (referred to as control, hereinafter) of the protective circuit 21E discriminates whether a constant time has elapsed after the start of the motor 12. If NO, in step 302, control suppresses the switching operation of the chopper circuit 10. If YES, control allows the chopper circuit 10 to start the switching operation.

As described above, it is possible to protect the chopper circuit 10 and the inverter 11A from an increase in voltage at the start.

Further, in this embodiment, the inverter starting signal is inputted to the protective circuit 21E to suppress the switching operation of the chopper circuit 10, until a constant time has elapsed. However, since the frequency of the inverter 11A increases roughly in proportion to the lapse of time at the start of the inverter 11A, it is possible to obtain the same effect by discriminating whether the output frequency of the inverter 11A exceeds a constant value (instead of the discrimination of the time elapsed) and by suppressing the switching operation of the chopper circuit 10 until the frequency thereof reaches a constant value.

Figure 17:
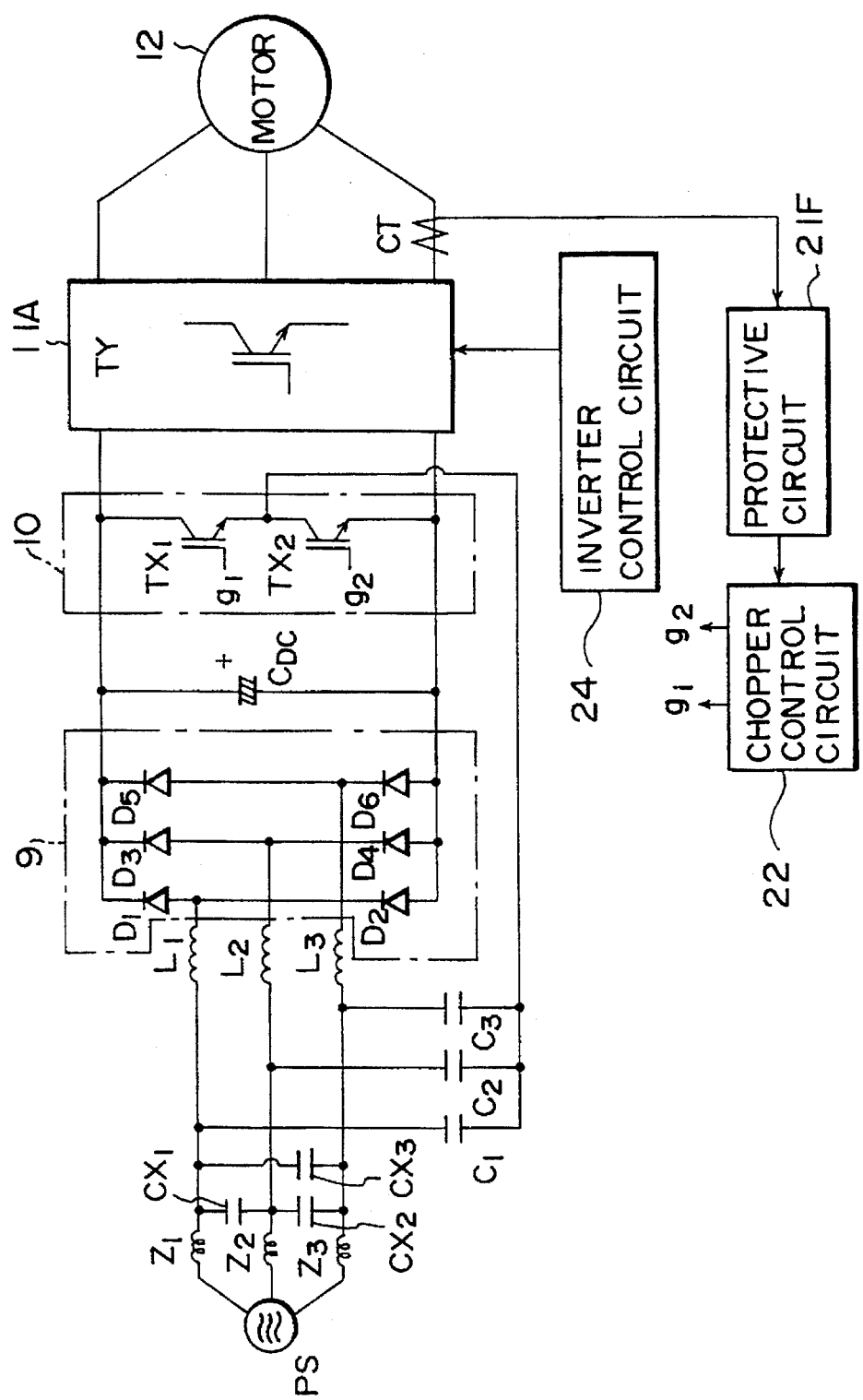
FIG. 17, is a circuit diagram showing a seventh embodiment of the power converter according to the present invention.

FIG. 17 shows a seventh embodiment of the power converter according to the present invention. In this embodiment, the current of the motor 12 is detected by a current transformer CT, and detected signal is applied to a protective circuit 21F. The protective circuit 21F applies a signal for controlling the conduction ratio (duty factor) of the chopper circuit 10 to the chopper control circuit 22 in such a way that the detected current can be minimized.

Figure 18:
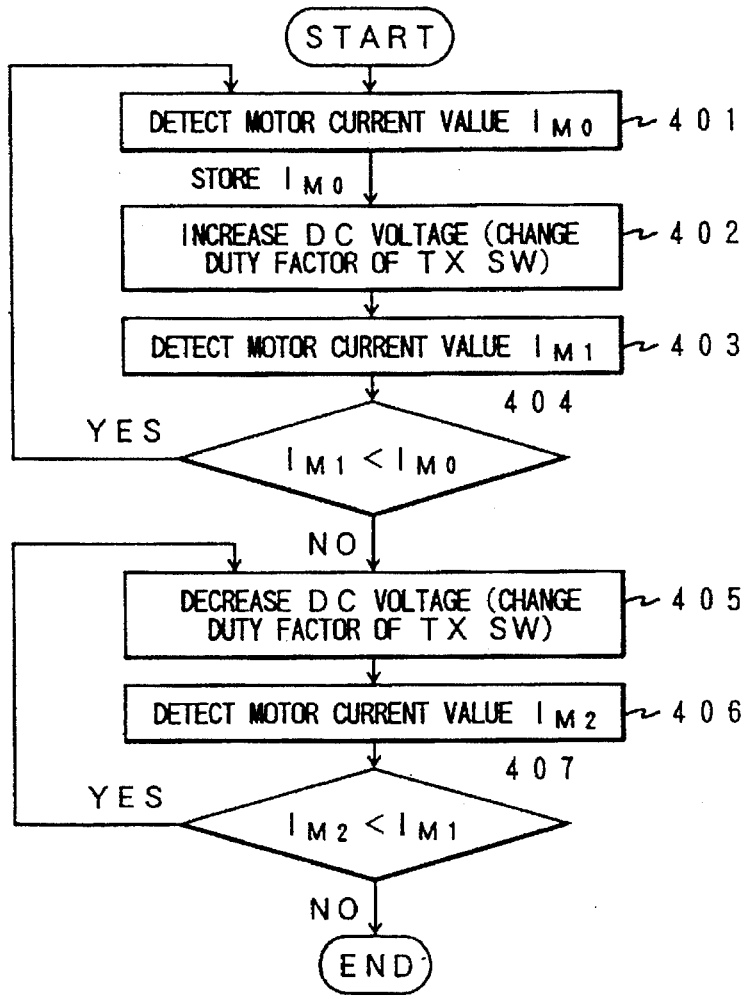
FIG. 18 is a flowchart for assistance in explaining the operation of the power converter shown in FIG. 17.

FIG. 18 shows a flowchart showing the processing procedure of the protective circuit 21F of the power converter shown in FIG. 17. In step 401, a control section or microcomputer (referred to as control, hereinafter) of the protective circuit 21F detects and stores motor current $I_{M0}$. Further, in step 402, control outputs a signal for slightly increasing the DC voltage, that is, to slightly increase the duty factor. In step 403, control detects and stores the motor current value $I_{M1}$ at this time. Further, in step 404, control compares the current value $I_{M0}$ with $I_{M1}$. If $I_{M1} < I_{M0}$, control repeats the above-mentioned steps 401 to 404, and if $I_{M2} \geq I_{M0}$, control executes the steps 405 and after.

In step 405, control outputs a signal for slightly decreasing the DC voltage, that is, to slightly decrease the duty factor. In step 406, control detects and stores the motor current value $I_{M2}$ at this time. Further, in step 407, control compares the current value $I_{M1}$ with $I_{M2}$. If $I_{M2} < I_{M1}$, control repeats the above-mentioned steps 405 to 407, and if $I_{M2} \geq I_{M1}$, control once ends a series of the procedure, and executes the steps 401 and after again.

Figure 19:
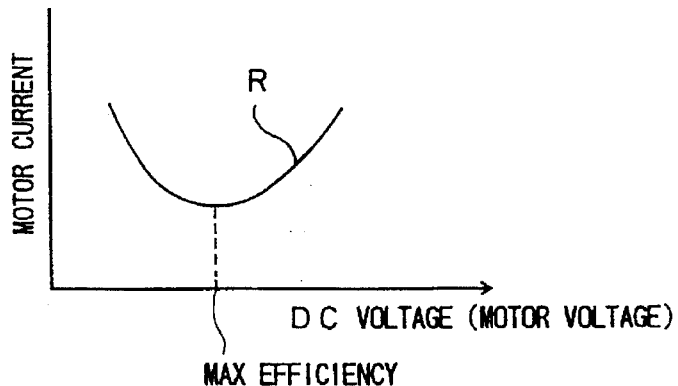
FIG. 19 is a graphical representation showing the relationship between the DC voltage and the motor current, for assistance in explaining the operation of the power converter shown in FIG. 17.

FIG. 19 shows the relationship between the motor current and the DC motor voltage, which corresponds to the above-mentioned processing. That is, when the steps 401 to 404 are repeated, the motor current is minimized from the left to the right in the characteristic curve R; on the other hand, when the steps 405 to 407 are repeated, the motor current is minimized from the right to the left in the characteristic curve R.

As a result, it is possible to minimize the current flowing through the chopper circuit 10 and the inverter 11A by use of only a single protective circuit 21F, thus maximizing the power efficiency.

Further, in the respective embodiments described above, the power converter applied to a three-phase AC power source has been explained by way of example. However, the power converter according to the present invention can be of course applied to a single-phase AC power source or a multi-phase (6 or more) AC power source.

The above-mentioned power converters as described above are provided with such an advantage that the input current and voltage waveforms can be kept under excellent conditions, without being subjected to the influence of the line impedances even if the input current increases, so that it is possible to securely suppress the oscillation. This advantage of the power converter can be obtained in the apparatus using the same power converter. As an example, when the power converter according to the present invention is used for an air conditioner controlled by an inverter, since the voltage waveform can be stabilized, it is possible to suppress abnormal noise generated by the motors for driving in-door and out-door air blowers, respectively. Some embodiments of the air conditioner provided with the power converter according to the present invention will be described hereinbelow.

Figure 20:
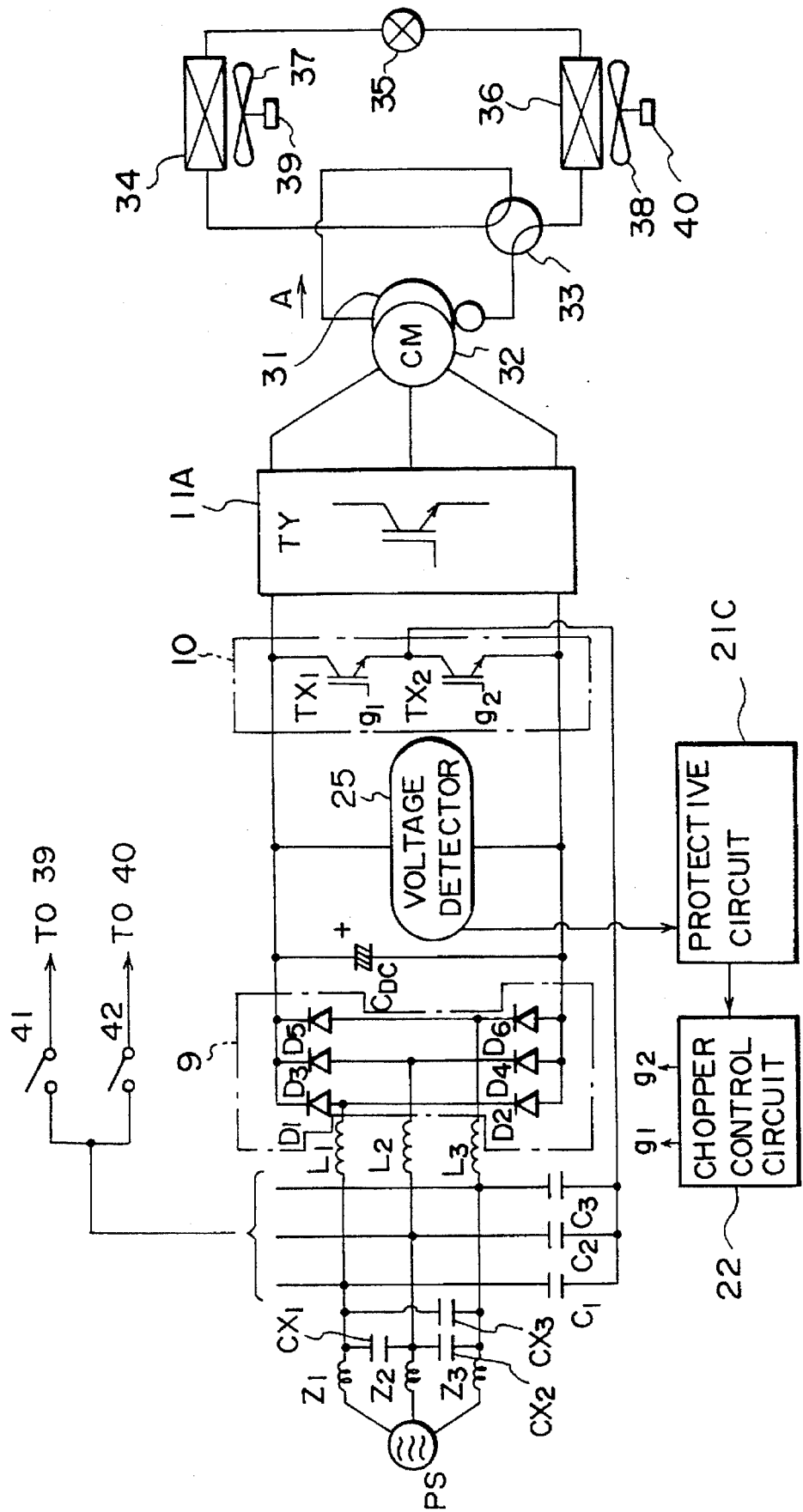
FIG. 20 is a circuit diagram showing a first embodiment of an air conditioner according to the present invention.

FIG. 20 is a first embodiment of the air conditioner provided with the power converter according to the present invention shown in FIG. 9, to drive a compressor included in a refrigerating cycle. In this embodiment, an output of the inverter 11A is supplied to a motor 32 for driving a compressor 31. Here, the refrigerating cycle is composed of the compressor 31, a four-way valve 33, an in-door heat exchanger 34, an expansion valve 35, and an out-door heat exchanger 36. Further, an in-door air blower 37 is provided to promote the heat exchange of the in-door heat exchanger 34, and an out-door air blower 38 is provided to promote the heat exchange of the out-door heat exchanger 36, respectively. The in-door air blower 37 is driven by a motor 39, and the out-door air blower 38 is driven by a motor 40. The motors 39 and 40 are connected to the power source PS via two switches 41 and 42, respectively. When being controlled by a control unit (not shown), the two motors 39 and 40 are controllably driven by the voltage of the power source PS. In FIG. 20, when refrigerant is circulated in the arrow direction A, the air conditioner operates in heating mode, and when refrigerant is circulated in the direction opposite to the arrow direction A by changing-over the four-way valve 33, the air conditioner operates in cooling mode. Further, the output frequency and the output voltage of the inverter 11A are changed according to the air conditioning load in accordance with a V/F pattern representative of predetermined relationship between the voltage and the frequency. Since the capacity control operation and the V/F pattern both controlled according to the air conditioning load are well known, the detailed description thereof is omitted herein. This V/F pattern is usually determined in proportional relationship between the voltage and the frequency of the inverter 11A.

In the air conditioner shown in FIG. 20, even if the input current of the power converter increases, since the distortion of the voltage waveform of the power source side can be suppressed, it is possible to eliminate motor noise generated due to the distortion of the voltage waveform. In the in-door unit of the air conditioner, in particular, when abnormal sound (noise) is generated by the motor 39 for the in-door air blower 37, the comfortableness has been so far reduced. In the air conditioner according to the present invention, since in-door noise can be suppressed, it is possible to improve the comfortableness of the air conditioner. Further, noise of the motor 40 for the outdoor air blower 38 can be also reduced. In addition, since the distortion of the input current waveform can be reduced, the air conditioner is not susceptible to external noise, so that it is possible to reduce the erroneous operation and thereby to improve the reliability thereof.

Further, when the power converter according to the present invention is applied to the air conditioner, there exists another effect such that the high power factor operation can be realized. In other words, the power factor of the rectifier 9 composed of bridge connection diodes $D_1$ to $D_6$ has been so far about 92 to 94% in average when the rectifier 9 is operated under variable capacity condition. In the case of the air conditioner shown in FIG. 20, however, it is possible to increase the power factor of the rectifier 9 as high as 98 to 99%, so that the power factor can be improved by about 6%. In particular, although the power factor is low in low capacity operation, in this embodiment, it is possible to attain a high power factor operation from a low capacity to a high capacity.

Figure 21:
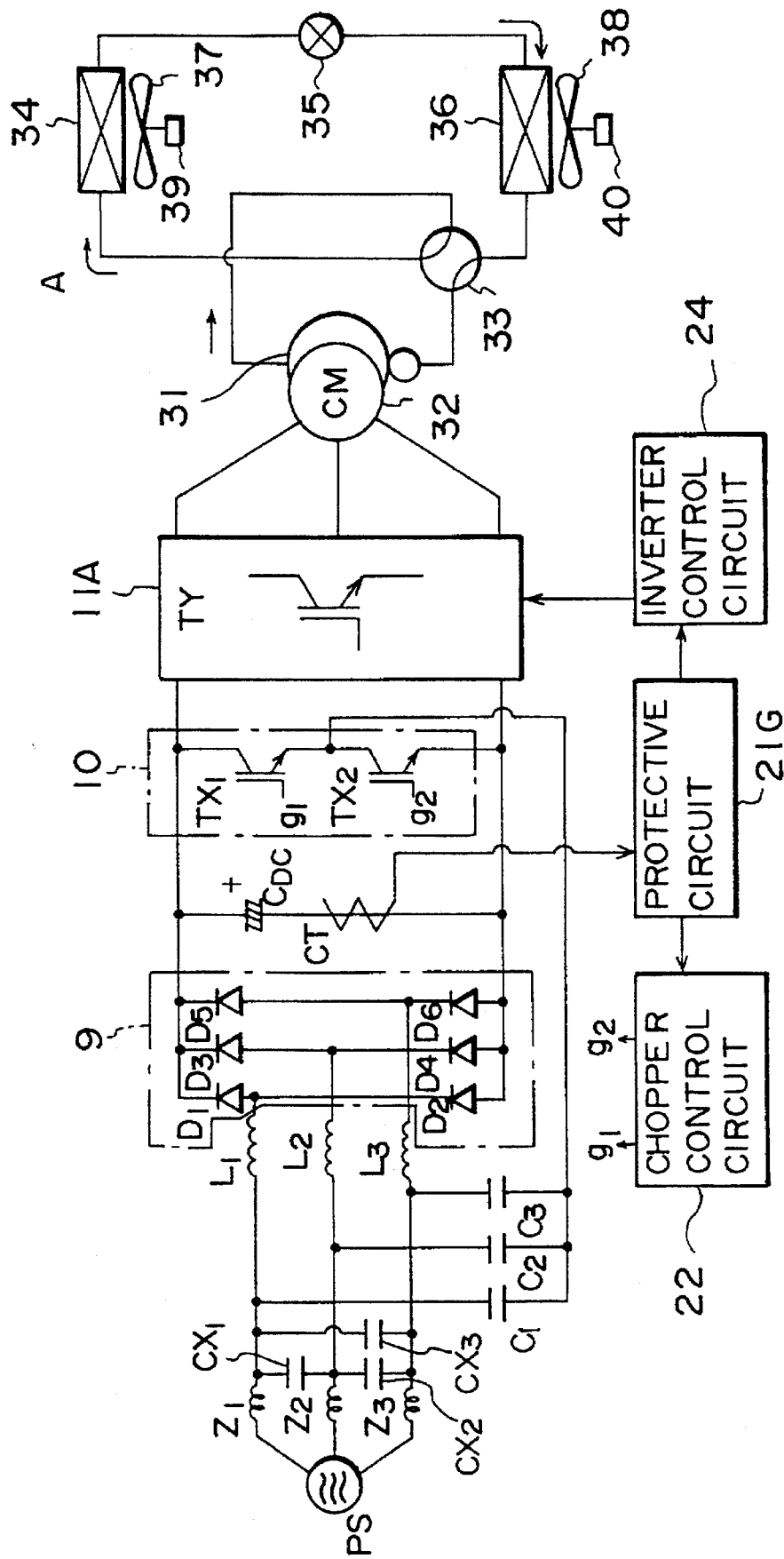
FIG. 21 is a circuit diagram showing a second embodiment of an air conditioner according to the present invention.

FIG. 21 shows a second embodiment of the air conditioner provided with the power converter according to the present invention shown in FIG. 8, to drive a compressor 31 included in the refrigerating cycle. Further, instead of the protective circuit 21B shown in FIG. 8, another protective circuit 21G of different function is provided therefor. Further, the motor 32 for driving the compressor 31 included in the refrigerating cycle is connected to the AC output terminal of the inverter 11A. In this embodiment, although the chopper circuit 10 can reduce the distortion of the voltage waveform and the current waveform even if the input current increases, there exists the case where an over-current flows when the chopper circuit 10 is turned on or off. However, experiments have indicated that the DC input voltage applied to the inverter 11A drops, when the chopper circuit 10 is kept protected under these conditions, that is, kept turned. Therefore, it is convenient that the inverter 11A can be operated emergency, on condition that the inverter 11A is normal, while protecting the chopper circuit 10. Such operation as described above is referred to as backup operation, hereinafter. The protective circuit 21G shown in FIG. 21 is additionally provided with such a function as to output a backup operation command. Further, as already explained, the output frequency and the output voltage of the inverter 11A are both controlled in accordance with a V/F pattern (the voltage to frequency ratio is kept constant). Therefore, in order that the compressor 31 has the same capacity even if the input voltage of the inverter 11A is reduced, it is necessary to change the V/F pattern.

When a sudden current flowing through the smoothing capacitance $C_{DC}$ is detected, the protective circuit 21G shown in FIG. 21 discriminates whether the chopper circuit 10 or the inverter 11A is out of order. If the chopper circuit 10 is abnormal and the inverter 11A is normal, the protective circuit 21G outputs a chopper protecting command to the chopper control circuit 22 to change the V/F pattern and further outputs an inverter operating command to the inverter control circuit 24. Here, the change of the V/F pattern is executed to provide a V/F ratio necessary to secure the preceding secondary magnetic flux of the motor 32.

Figure 22:
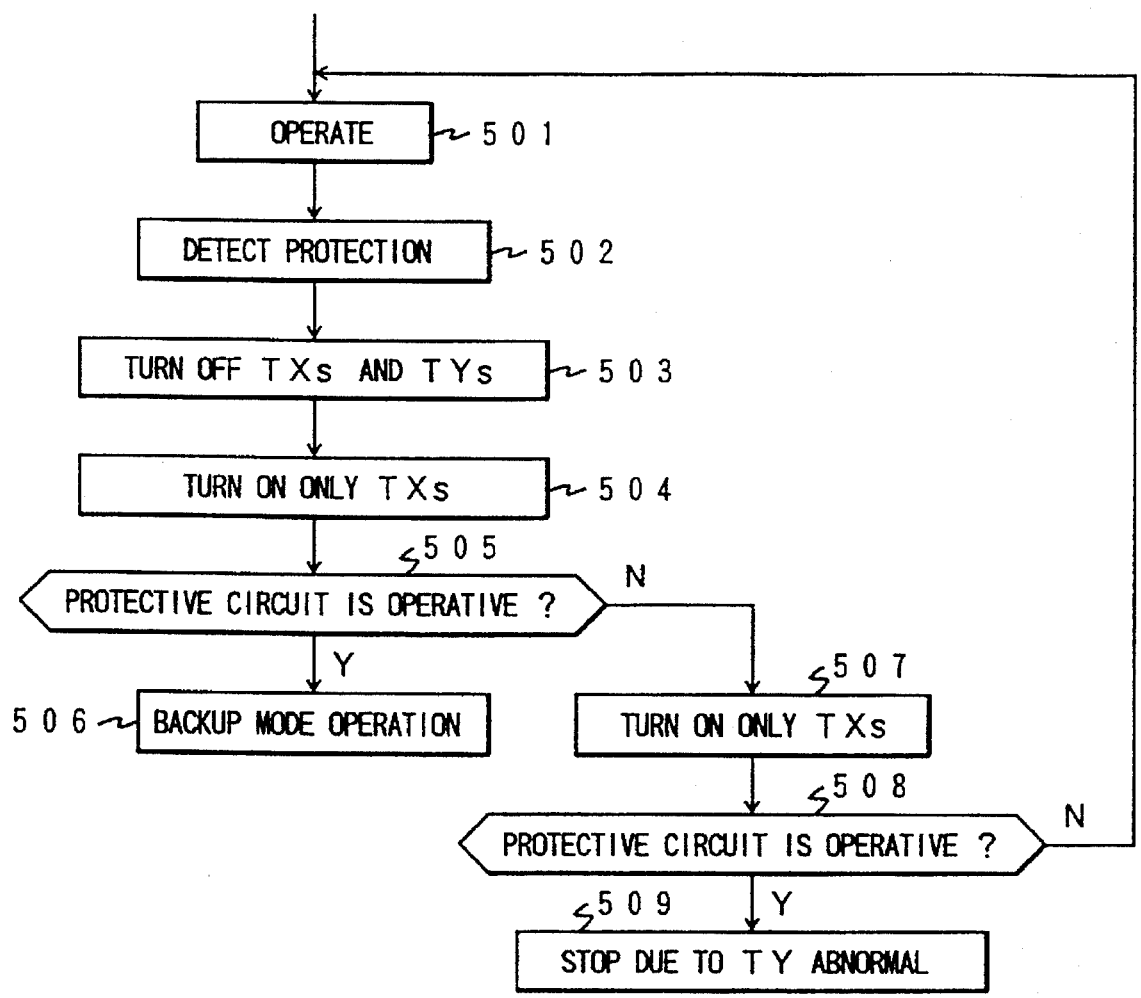
FIG. 22 is a flowchart for assistance in explaining the operation of the air conditioner shown in FIG. 21.

FIG. 22 shows a flowchart showing the processing procedure of the protective circuit 21G of the power converter shown in FIG.. 21.

In step 501, a control section or microcomputer (referred to as control, hereinafter) of the protective circuit 21G outputs an ordinary operation command to detect current. In step 502, when the detected current exceeds a protection level, in step 503 control turns off the transistors $TX_1$ and $TX_2$ of the chopper circuit 10 and the transistors TY of the inverter 11A. After that, in step 504 control activates only the transistors $TX_1$ and $TX_2$, and in step 505 Control discriminates whether the protective circuit 21G is operative. If YES, since this indicates that the transistors $TX_1$ and $TX_2$ are abnormal but the transistors TY are normal, in step 506 control outputs a backup mode operation command. Here, the backup mode operation implies that the transistors $TX_1$ and $TX_2$ of the chopper circuit 10 are turned off and the transistors TY of the inverter 11A are turned on, while displaying an abnormal operation. On the other hand, when the protective circuit 21G is not operative even if the transistors $TX_1$ and $TX_2$ of the chopper circuit 10 are turned on, in step 507 control activates only the transistors TY of the inverter 11A and in step 508 control discriminates whether the protective circuit 21G is operative. If YES, since this indicates that the transistors TY are abnormal, control outputs a stop command to the inverter 11A. If NO, on the other hand, control returns to step 501 to output the ordinary operation command.

As described above, in the present invention, only the single protective circuit 21G can protect both the chopper circuit 10 and the inverter 11A. In addition, when only the chopper circuit 10 is out of order, it is possible to obtain a required air conditioning capacity by the emergency backup operation.

In the embodiment shown in FIG. 8, since the rating of the transistors $TX_1$ and $TX_2$ of the chopper circuit 10 is determined to be the same as that of the transistors TY of the inverter 11A, the protection level of both the circuits is the same, so that only one protective circuit 21B can protect both the circuits 10 and 11A. However, when the averaged current value flowing through these transistors is taken into account, respectively, it is effective, from the standpoint of durability, when the transistors $TX_1$ and $TX_2$ having a current capacity larger than that of the transistors TY are used. In other words, the transistors $TX_1$ and $TX_2$ of the chopper 10 share a half of the load current, respectively. On the other hand, three transistors of the inverter 11A share ⅓ of the load current, respectively.

Figure 23:
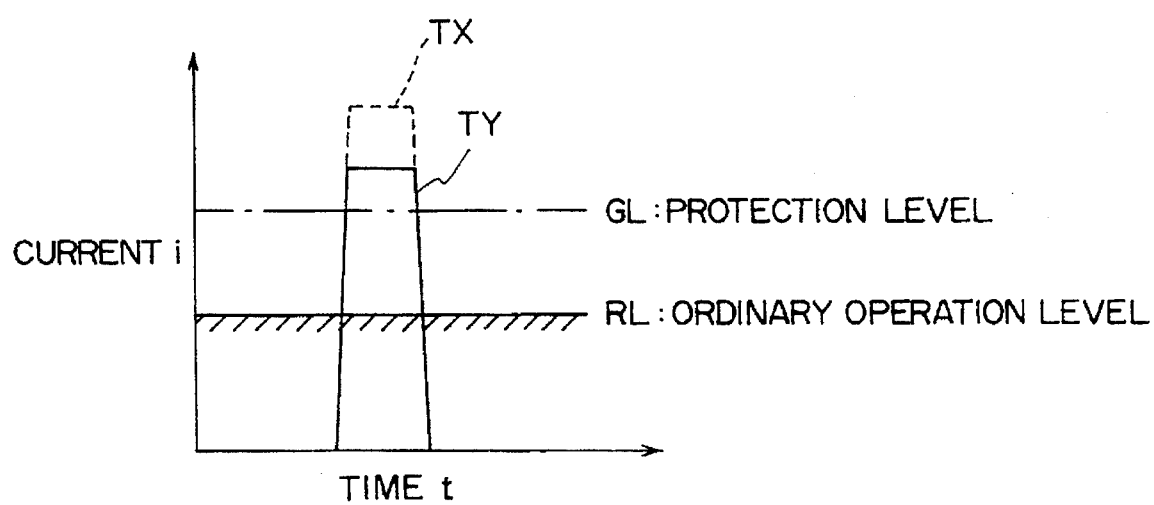
FIG. 23 is a graphical representation showing the relationship between the current and time of the essential portion of the air conditioner shown in FIG. 21, for assistance in explaining the operation thereof.

As a result, as shown in FIG. 23, the short-circuit current waveforms of these transistor are such that the current flowing through the transistor TX is large and the current flowing through the transistor TY is small. In this embodiment, therefore, the transistor TX having a current capacity larger than that of the transistor TY is used, and the common protection level GL is set in such a way as to be lower than the short-circuit current of the transistor TY but higher than the ordinary operation level RL thereof. By determining the transistors as described above, it is possible to obtain an air conditioner of high durability.

Figure 24A:
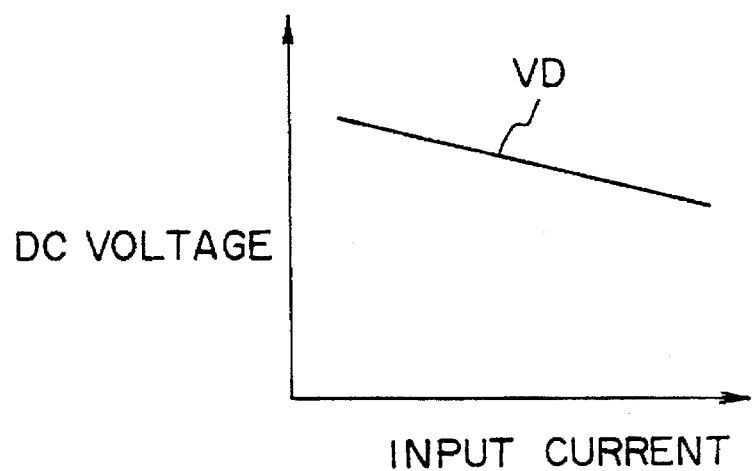
FIGS. 24A and 24B are graphical representations showing the relationship between the voltage, the current and the frequency of the essential portions, for assistance in explaining the operation of the air conditioner shown in FIG. 21.
Figure 24B:
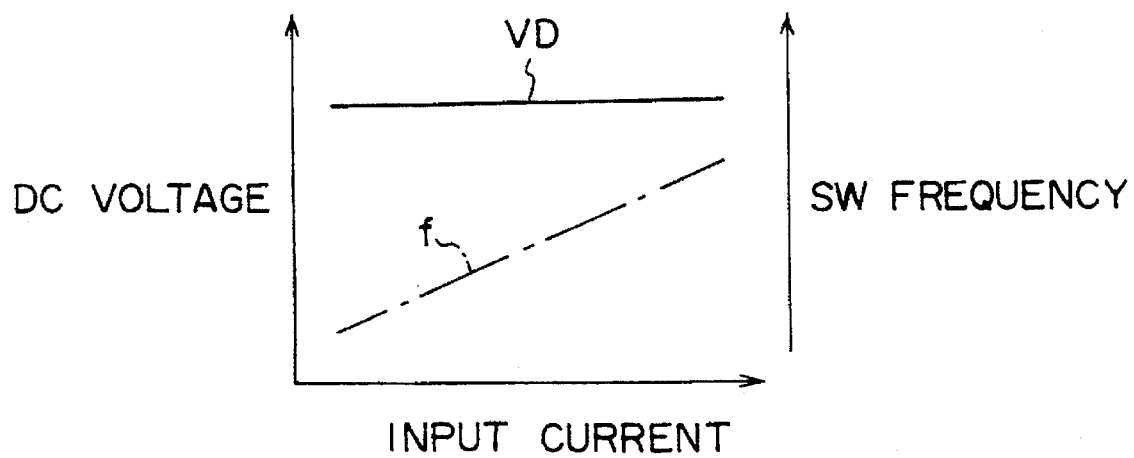

On the other hand, in the power converters as shown in FIGS. 20 and 21, the relationship between the AC input current and the DC voltage across the smoothing capacitor $C_{DC}$ is such that the DC voltage decreases (or increases) with increasing (or decreasing) AC input current when the switching frequency is kept constant, as shown by the characteristic curve VD shown in FIG. 24A. To overcome this problem, there exists such a method that the switching frequency f of the chopper circuit 10 is changed (decreased) with decreasing AC input current value.

Figure 25:
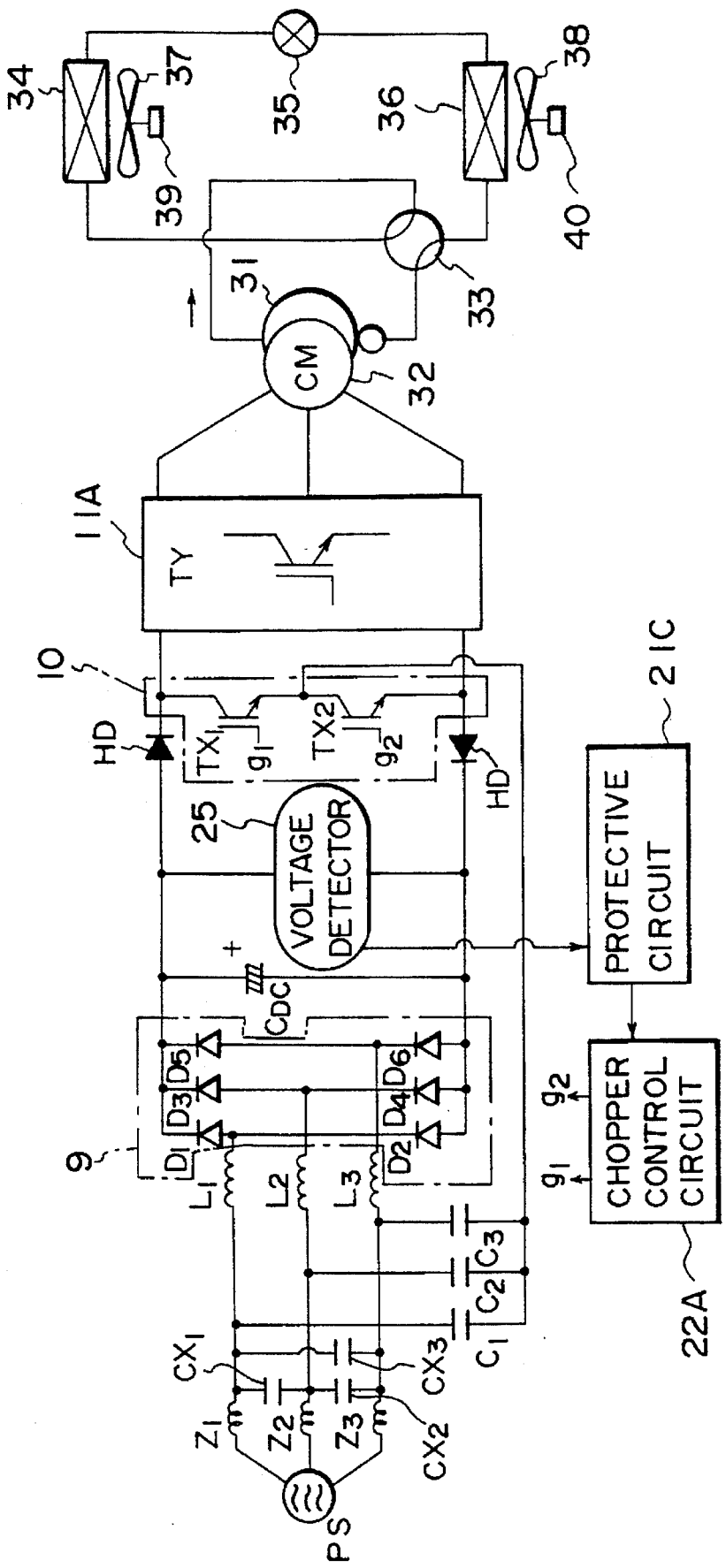
FIG. 25 is a circuit diagram showing a third embodiment of an air conditioner according to the present invention.

FIG. 25 shows a third embodiment of the air conditioner according to the present invention, in which the compressor 31 included in the refrigerating cycle is driven by the power converter shown in FIG. 9 (fourth embodiment). In FIG. 25, the chopper control circuit 22A detects the voltage across the smoothing capacitor $C_{DC}$ through a voltage detector 25 and the protective circuit 21C, and is provided with such a function as to control the switching frequency f of the chopper circuit 11A so that the DC voltage across the smoothing capacitor $C_{DC}$ can be kept constant. Further, in this embodiment, two high speed diodes HD responsive to a large voltage change rate are connected in the positive and negative DC current circuits between the smoothing capacitor $C_{DC}$ and the chopper circuit 10, respectively to cope with an increase of the switching frequency f of the chopper circuit 11A. This is because since the diodes $D_1$ to $D_6$ constituting the rectifier 9 are of ordinary low-speed type, these diodes $D_1$ to $D_6$ cannot respond to an increase of the switching frequency of the transistors $TX_1$ and $TX_2$. In this case, however, when the diodes $D_1$ to $D_6$ constituting the rectifier 9 are of high-speed type, the high speed diodes HD are unnecessary.

Figure 26A:
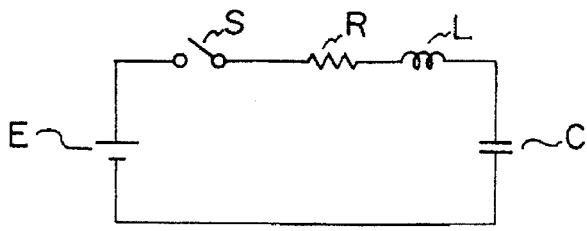
FIGS. 26A to 26D are illustrations for assistance in explaining the switching frequencies of the essential elements of the air conditioner shown in FIG. 25.

In this case, the range of the switching frequency of the chopper circuit 10 can be decided as follows:

Here, the assumption is made that as shown in FIG. 26A, the transistors $TX_1$ and $TX_2$ of the chopper 10 are denoted by S; the circuit elements such as the star connection capacitors $C_1$, $C_2$ and $C_3$, the ring connection capacitors $CX_1$, $CX_2$ and $CX_3$, and the reactors $L_1$, $L_2$ and $L_3$ are represented equivalently by a resistance R, an inductance L and a capacitance C, respectively. The equivalent circuit obtained when seen from the chopper circuit 10 can be represented by a simple serial oscillation circuit in which an DC power source E is connected to a series circuit of RLC via a switch S. Here, since R can be assumed as zero, the following vibration conditions is assumed to be satisfied:

$$\frac{1}{LC} > \left(\frac{R}{2L}\right)^2 \quad (2)$$

Here, $\alpha$ and $\beta$ are defined as:

$$\alpha = \left(\frac{R}{2L}\right), \beta = \sqrt{\frac{1}{LC} - \left(\frac{R}{2L}\right)^2}$$

By using the above $\alpha$ and $\beta$, the current i flowing after the switch has been turned on can be represented by $$i = \frac{2E}{\sqrt{\frac{4L}{C} - R^2}} \cdot e^{-\alpha t} \cdot \sin \beta t \quad (3)$$

Here, since the resistance is roughly zero, the following equation can be obtained:

$$R < 2\sqrt{\frac{L}{C}} \quad (4)$$

Figure 26B:
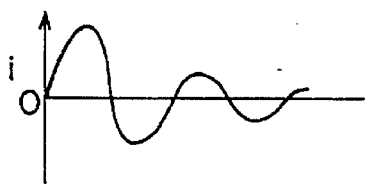

Therefore, the change in current i becomes as shown in FIG. 26B. Further, if R=0, the equation (3) can be expressed as:

$$i = \frac{E}{\sqrt{\frac{L}{C}}} \cdot \sin \frac{t}{\sqrt{LC}} \quad (5)$$

Figure 26C:
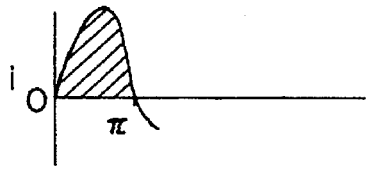
Figure 26D:
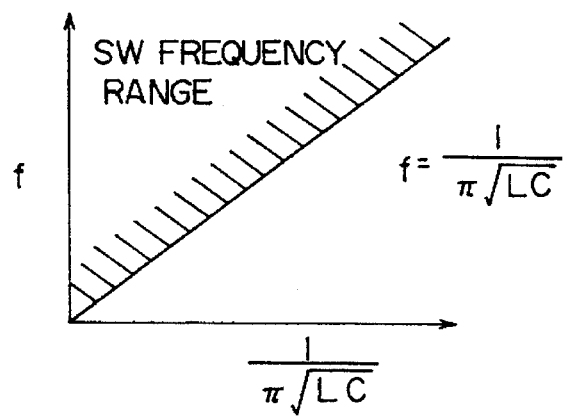

Here, the time from when the current as expressed by equation (5) begins to flow to when returns to zero is as shown in FIG. 26C. Since the capacitor C must be charged up before this time π, the following equation can be established as:

$$\frac{t}{\sqrt{LC}} < \pi \quad (6)$$

When the equation (6) is further rewritten, the following equation can be obtained:

$$f = \frac{1}{t} > \frac{1}{\pi\sqrt{LC}} \quad (7)$$

Accordingly, the frequency f corresponding to L and C are selected so that the equation (7) can be satisfied. In other words, the frequency range is determined so as not exceed the hatched range.

For instance, if L=0.5 mH and C=5 μF, the switching frequency f must be determined 6.3 kHz or higher, and if L=0.2 mH and C=3 μF, the switching frequency f must be determined 13 kHz or higher. In the chopper control circuit 22A shown in FIG. 25, the switching frequency f is decided under these conditions to control the voltage stably.

Further, it is also possible to increase (or decrease) the duty factor of each switching element, instead of increasing (decreasing) the switching frequency. Or else, when it is difficult to change the frequency of the switching elements, it is also preferable to change both the switching frequency and the duty factor.

What is claimed is:

1. A power converter, comprising:
   a rectifier composed of a plurality of bridge-connected diodes, an AC input terminal thereof being connected to an AC power source;
   reactors each connected in series in a power line connecting between said rectifier and the AC power source, respectively;
   star connection capacitors, each of one end thereof being connected to the power line between the AC power source and each of said reactors, and each of the other end thereof being connected in common;
   a chopper circuit having two switching elements connected in series between two DC output terminals of said rectifier, a mutual common connection point of the two switching elements being connected to the common connection point of said star connection capacitors, the two switching elements being controllably turned on or off at a frequency greatly higher than a frequency of the AC power source;
   a smoothing capacitor connected between the DC output terminals of said rectifier; and
   ring connection capacitors each connected between two power lines and further between the AC power source and each of said reactors.

2. The power converter of claim 1, wherein capacitance of each of said ring connection capacitors is larger than that of each of said star connection capacitors.

3. The power converter of claim 1, which further comprises:
   an inverter composed of switching elements the same in current rating as that of the switching elements of said chopper circuit, said inverter converting DC power rectified by said rectifier and smoothed by said smoothing capacitor into AC power to supply to a load;
   current detecting means for detecting output current of said rectifier; and
   a protective circuit for applying a protection signal to both said chopper circuit and said inverter, when current value detected by said current detecting means exceeds a predetermined reference value.

4. The power converter of claim 1, which further comprises:

an inverter composed of switching elements the same in current rating as that of the switching elements of said chopper circuit, said inverter converting DC power source outputted by said rectifier into AC power to supply to a load;

current detecting means for detecting change rate of current flowing through said smoothing capacitor; and a protective circuit for applying a protection signal to both said chopper circuit and said inverter, when the current change rate detected by said current detecting means exceeds a predetermined reference value.

5. The power converter of claim 1, which further comprises:

voltage detecting means for detecting DC voltage generated across said smoothing capacitor; and a protective circuit for correcting duty factor or switching frequency of the two switching elements of said chopper circuit so that the DC voltage detected by said voltage detecting means does not exceeds a predetermined reference value.

6. The power converter of claim 1, which further comprises:

current detecting means for detecting DC input current value or DC output current value of said rectifier; and a protective circuit for suppressing the switching operation of said chopper circuit until the current value detected by said current detecting means exceeds a predetermined value.

7. The power converter of claim 1, which further comprises:

an inverter for converting DC power rectified by said rectifier and smoothened by said smoothing capacitor into DC power to supply to a load; and a protective circuit for suppressing the switching operation of said chopper circuit until a predetermined time has elapsed after start of said inverter or unit output frequency of said inverter exceeds a predetermined value.

8. The power converter of claim 1, which further comprises:

an inverter for converting DC power rectified by said rectifier and smoothed by said smoothing capacitor into AC power to supply to a load;

current detecting means for detecting output current flowing the load; and a protective circuit for changing duty factor of the switching elements of said chopper circuit so that the current value detected by said current detecting means can be minimized.

9. The power converter of claim 1, which further comprises:

an inverter composed of switching elements each having current capacity smaller than that of the switching elements of said chopper circuit, for converting DC power rectified by said rectifier and smoothed by said smoothing capacitor into AC power to supply to a load;

current detecting means for detecting DC output current of said rectifier; and a protective circuit for applying a protection signal to both said chopper circuit and said inverter, when current value detected by said current detecting means exceeds a predetermined value.

10. The power converter of claim 1, which further comprises:

an inverter composed of switching elements each having current capacity smaller than that of the switching elements of said chopper circuit, for converting DC power rectified by said rectifier and smoothed by said smoothing capacitor into AC power to supply to a load;

current detecting means for detecting change rate of current flowing through said smoothing capacitor; and a protective circuit for applying a protection signal to both said chopper circuit and said inverter, when current change rate detected by said current detecting means exceeds a predetermined value.

11. An air conditioner, comprising:

a rectifier composed of a plurality of bridge-connected diodes, an AC input terminal thereof being connected to an AC power source;

reactors each connected in series in a power line connecting between said rectifier and the AC power source, respectively;

star connection capacitors, each of one end thereof being connected to the power line between the AC power source and each of said reactors, and each of the other end thereof being connected in common;

a chopper circuit having two switching elements connected in series between two DC output terminals of said rectifier, a mutual common junction point of the two switching elements being connected to the common junction point of said star connection capacitors, the two switching elements being controllably turned on or off at a frequency greatly higher than a frequency of the AC power source;

a smoothing capacitor connected between the DC output terminals of said rectifier;

ring connection capacitors each connected between two power lines and further between the AC power source and each of said reactors; and an inverter for converting DC power rectified by said rectifier and smoothed by said smoothing capacitor into AC power to supply to a motor for driving a compressor included in a refrigerating cycle.

12. The air conditioner of claim 11, wherein said inverter changes AC output frequency thereof according to change in air conditioner load and AC output voltage thereof in accordance with a predetermined V/F pattern indicative of relationship between the voltage and the frequency; and when two switching elements for constituting said chopper circuit are abnormal, said inverter turning off these switching elements of the chopper circuit and further changing the frequency thereof in accordance with another V/F pattern to maintain magnetic flux of the compressor driving motor.

13. The air conditioner of claim 11, wherein said chopper circuit is composed of the switching elements having a current capacity larger than that of switching elements for constituting said inverter; and a reference current value for discriminating whether the respective switching elements of both said chopper circuit and said inverter must be protected or not is determined in common for both said chopper circuit and said inverter.

14. The air conditioner of claim 11, wherein when an input current to said rectifier increases or decreases, at least one of switching frequency and duty factor of the switching elements for constituting said chopper circuit is decreased or increased to maintain an input voltage of said inverter at a constant level.

15. The air conditioner of claim 14, wherein the switching frequency f of said chopper circuit is maintained within a following range $$f > \frac{1}{\pi \sqrt{LC}}$$

where L denotes an inductance and C denotes a capacitance of a series connected RLC equivalent circuit when seen from both ends of said chopper circuit.

16. The air conditioner of claim 11, wherein said rectifier is composed of low-speed diodes; and two high-speed diodes are connected in positive and negative connection lines between said rectifier and said chopper circuit, respectively.

* * * * *